(12) United States Patent
Ogata et al.

(10) Patent No.: US 10,516,157 B2
(45) Date of Patent: Dec. 24, 2019

(54) ELECTRODE ACTIVE MATERIAL, ELECTRODE AND SECONDARY BATTERY INCLUDING THE SAME, AND METHOD OF PREPARING THE ELECTRODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Ken Ogata, Yokohama (JP); Koichi Takei, Hwaseong (KR); Kanghee Lee, Suwon-si (KR); Byoungsun Lee, Seoul (KR); Jaemyung Lee, Seoul (KR); Minwoo Lim, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 104 days.

(21) Appl. No.: 15/205,068

(22) Filed: Jul. 8, 2016

(65) Prior Publication Data

US 2017/0077497 A1    Mar. 16, 2017

(30) Foreign Application Priority Data

Sep. 16, 2015   (KR) .................. 10-2015-0131053

(51) Int. Cl.
  *H01M 4/36*     (2006.01)
  *H01M 10/0525*  (2010.01)
  (Continued)

(52) U.S. Cl.
  CPC .......... *H01M 4/364* (2013.01); *H01M 4/386* (2013.01); *H01M 4/622* (2013.01); *H01M 4/624* (2013.01); *H01M 4/625* (2013.01); *H01M 4/626* (2013.01)

(58) Field of Classification Search
  None
  See application file for complete search history.

(56) References Cited

U.S. PATENT DOCUMENTS

| 8,367,248 B2 | 2/2013 | Yew et al. |
| 2005/0095504 A1 | 5/2005 | Kim et al. |

(Continued)

FOREIGN PATENT DOCUMENTS

| KR | 1020050041661 A | 5/2005 |
| KR | 100814880 A | 3/2008 |

(Continued)

OTHER PUBLICATIONS

Bae et al. A Water-Soluble and Self-Doped Conducting Polypyrrole Graft Copolymer. Macromolecules, 1044-1047. 2005. (Year: 2005).*

(Continued)

*Primary Examiner* — Christopher P Domone
(74) *Attorney, Agent, or Firm* — Cantor Colburn LLP

(57) ABSTRACT

An electrode active material including a secondary particle, the secondary particle including: a plurality of primary particles including a silicon-containing material; an electrically conductive material; and a chemically cross-linked water-insoluble polymer. Also an electrode, and a secondary battery, both of which include the electrode active material, and a method of preparing the electrode active material.

33 Claims, 13 Drawing Sheets

(51) Int. Cl.
  *H01M 4/62* (2006.01)
  *H01M 4/38* (2006.01)

(56) References Cited

U.S. PATENT DOCUMENTS

| | | | |
|---|---|---|---|
| 2005/0214644 A1 | 9/2005 | Aramata et al. | |
| 2010/0136431 A1 | 6/2010 | Lee et al. | |
| 2012/0263998 A1* | 10/2012 | Thackeray | H01M 4/131 429/156 |
| 2014/0242461 A1 | 8/2014 | Hwang et al. | |
| 2014/0287317 A1* | 9/2014 | Tiquet | C01B 33/02 429/231.8 |
| 2015/0017527 A1 | 1/2015 | Lee et al. | |
| 2015/0086870 A1* | 3/2015 | Fukasawa | H01M 4/131 429/218.1 |
| 2015/0287993 A1* | 10/2015 | Komaba | C08G 18/025 429/217 |

FOREIGN PATENT DOCUMENTS

| | | | |
|---|---|---|---|
| KR | 1020090051627 A | | 5/2009 |
| KR | 1020100132839 A | | 12/2010 |
| KR | 1020140106292 A | | 9/2014 |
| KR | 1020150008327 A | | 1/2015 |
| WO | WO2014065407 | * | 5/2014 |
| WO | 2014141960 A1 | | 9/2014 |
| WO | 2015072359 A1 | | 5/2015 |

OTHER PUBLICATIONS

European Search Report for European Patent Application No. 16187438.3 dated Nov. 22, 2016.

Gu et al., "Mesoscale Origin of the Enhanced Cycling-Stability of the Si-Conductive Polymer Anode for Li-ion Batteries", Scientific Reports, 4, 2014, pp. 1-7.

Liu et al., "Three-Dimentional Hierarchical Ternary Nanostructures for High-Performance Li-Ion Battery Anodes", Nano Letters, 13, 2013, pp. 3414-3419.

Ogata et al., "Revealing lithium-silicide phase transformations in nano-structured silicon-based lithium ion batteries via in situ NMR spectroscopy", Nature Communications,5, 2014, pp. 1-11.

Wu et al., "Stable Li-ion Battery anodes by in-situ polymerization of conducting hydrogel to conformally coat silicon nanoparticles", Nature Communications,4, 2013, pp. 1-6.

* cited by examiner

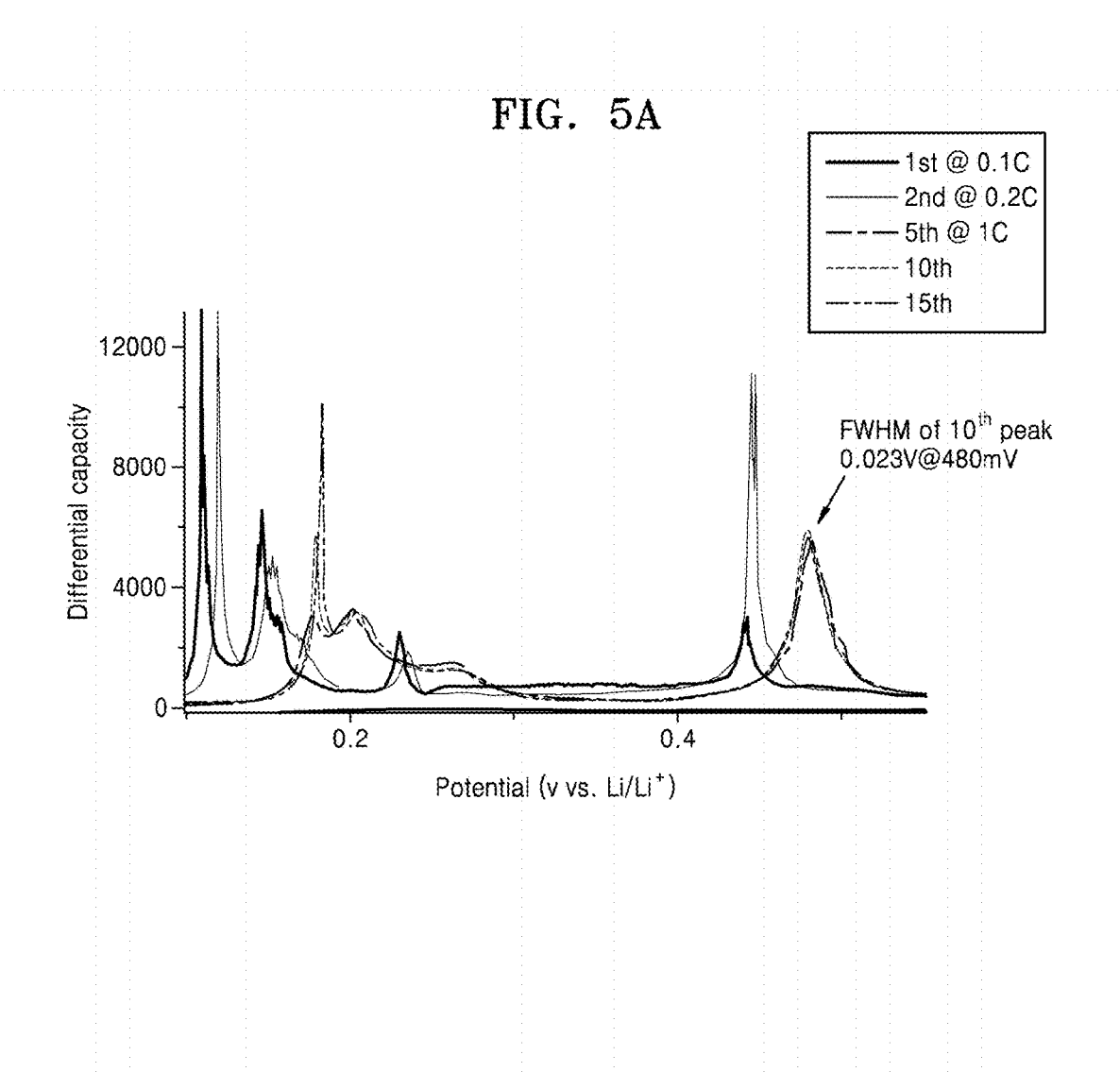

ELECTRODE ACTIVE MATERIAL, ELECTRODE AND SECONDARY BATTERY INCLUDING THE SAME, AND METHOD OF PREPARING THE ELECTRODE ACTIVE MATERIAL

CROSS-REFERENCE TO RELATED APPLICATION

This application claims priority to and the benefit of Korean Patent Application No. 10-2015-0131053, filed on Sep. 16, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrode active material, and an electrode and a secondary battery that include the electrode active material, and a method of preparing the electrode active material.

2. Description of the Related Art

A silicon-based material has received attention for use as an electrode active material for a high-capacity secondary battery because silicon can provide a theoretical capacity of about 3,570 mAh/g at room temperature. However, the silicon-based material may undergo a volume expansion (of up to about 300%) during intercalation/deintercalation of lithium ions.

The volume expansion of the silicon-based material may cause mechanical strain, which is understood to be associated with the degradation of the silicon-based material and difficulties in controlling a solid electrolyte interphase (SEI) layer. Thus, an electrode active material using the silicon-based material may have a sudden deterioration in charge/discharge characteristics, and reduced lifespan, when used in a battery including the silicon electrode active material.

Therefore, there is a need to develop a silicon-based material which provides improved performance, and an electrode and a secondary battery that include the electrode active material, and a method of preparing the electrode active material.

SUMMARY

Provided is an electrode active material having improved charge/discharge characteristics by controlling a reaction and diffusion of lithium ions.

Provided is an electrode including the electrode active material.

Provided is a secondary battery including the electrode.

Provided is a method of preparing the electrode active material.

Additional aspects will be set forth in part in the description which follows and, in part, will be apparent from the description, or may be learned by practice of the presented exemplary embodiments.

According to an aspect of an exemplary embodiment, an electrode active material includes a secondary particle, the secondary particle including: a plurality of primary particles of a silicon-containing material; an electrically conductive material; and a chemically cross-linked water-insoluble polymer.

According to an aspect of another exemplary embodiment, an electrode includes the electrode active material.

According to an aspect of another exemplary embodiment, a secondary battery includes the electrode.

According to an aspect of another exemplary embodiment, a method of preparing an electrode active material includes: contacting a plurality of primary particles of a silicon-containing material, an electrically conductive material, and a solvent to form a slurry; mixing the slurry to aggregate the primary particles and the electrically conductive material to form secondary particles comprising the primary particles and the electrically conductive material; providing a solution for forming a chemically cross-linked water-insoluble polymer; contacting the slurry comprising the secondary particles and the solution for forming the chemically cross-linked water-insoluble polymer to form a mixture; and heat treating the mixture to obtain the electrode active material, wherein the electrode active material includes a secondary particle, wherein the secondary particle includes a plurality of primary particles of a silicon-containing material, an electrically conductive material, and a chemically cross-linked water-insoluble polymer.

BRIEF DESCRIPTION OF THE DRAWINGS

These and/or other aspects will become apparent and more readily appreciated from the following description of the exemplary embodiments, taken in conjunction with the accompanying drawings in which:

FIG. 5A is a graph of differential capacity (dQ/dV, milliampere-hours per gram-volts (mAh/gV)) versus potential (volts versus $Li/Li^+$, V) and is a dQ/dV profile through a $15^{th}$ cycle of a lithium secondary battery prepared according to Comparative Example 2 with respect to $Li/Li^+$ at a part of an operating potential in a range of about 0 mV to about 600 mV;

DETAILED DESCRIPTION

Figure 1:
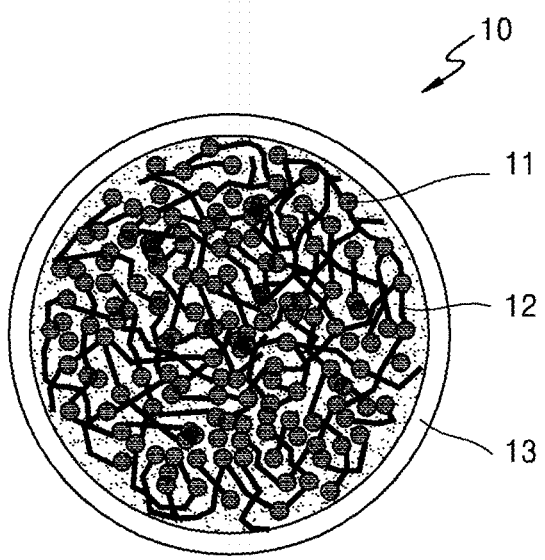
FIG. 1 is a schematic diagram of a structure of an electrode active material according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

Hereinafter, an electrode active material according to an exemplary embodiment, an electrode and a secondary battery that include the electrode active material, and a method of preparing the electrode active material will be described in further detail. Provided herein below are exemplary embodiments, the scope of which should not limit the scope of the present disclosure.

It will be understood that when an element is referred to as being "on" another element, it can be directly on the other element or intervening elements may be present therebetween. In contrast, when an element is referred to as being "directly on" another element, there are no intervening elements present.

It will be understood that although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, and do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The terms "silicon-based material" and "silicon-containing material" as used herein means a material including silicon (Si) in an amount of at least about 5 weight percent (wt %), based on a total weight of the material. For example, the silicon-based material may include silicon in an amount of at least about 10 wt %, at least about 20 wt %, at least about 30 wt %, at least about 40 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt %, such as about 10 wt % to about 95 wt %, or about 20 wt % to about 85 wt %, based on a total weight of the material.

The term "reaction and diffusion control agent of lithium ions" as used herein means substance that controls a reaction and diffusion of lithium ions with respect to primary particles of the silicon-based material upon contact between the primary particles of the silicon-based material and an electrolyte during intercalation and deintercalation of lithium ions.

The term "chemically cross-linked water-insoluble polymer" as used herein means a water-insoluble polymer in which polymer chains are linked collectively with each other via a covalent bond between a cross-linkable functional group and a carbon atom.

The term "water-insoluble" as used herein includes poorly water-soluble and water-insoluble characteristics, and means having a solubility in water of less than of less than 1 wt % based on a total weight of the water, e.g., less than 1 grams (g) of the substance per 100 g of water at 20° C., or $10^{-6}$ to 50 wt %, or $10^{-5}$ to 5 wt %.

The term "poorly water-soluble" as used herein means a water solubility of less than 50 wt % in water, e.g., 1 wt % to 50 wt % at 20° C., based on a total weight of the water.

The term "secondary particle" as used herein means a material prepared in a form of a particle and comprising aggregated primary particles.

The term "nanostructure" as used herein means a material having a nanoparticle structure, a nanofiber structure, a nanowire structure, or a nanotube structure, wherein the particle, the nanofiber, the nanowire, or the nanotube has a nanosized diameter.

The term "nanoscaffold" as used herein can be used to describe a nanostructure where one or more other materials, ingredients, layers, coatings, shells, and/or films can be arranged on a top portion, a bottom portion, a side portion, or on an adjacent portion of the nanoscaffold.

Throughout the specification, when a portion "includes" an element, another element may be further included, rather than excluding the existence of the other element, unless otherwise described.

The term "a combination thereof" as used herein refers to a mixture or combination of one or more components provided herein.

When a component "is disposed or arranged on" another element, one component can be placed next to and/or close to another element (e.g., attached to or placed on top of another element), and such disposition or arrangement can be made according to a spraying, layering, depositing, painting, dipping, bonding, coating, growing, or forming method.

A C rate means a current which will discharge a battery in one hour, e.g., a C rate for a battery having a discharge capacity of 1.6 ampere-hours would be 1.6 amperes.

Theoretically, a silicon-based material undergoes a volume expansion up to about 300% during intercalation/ deintercalation of lithium ions. To accommodate the volume expansion, modification of a shape or structure of the silicon-based material, or the formation of a composite of the silicon-based material and other materials has been made to improve a capacity of the silicon-based material and improve charge/discharge characteristics of a battery including the silicon-based material.

However, the Applicants have found that simple modification of a shape and/or structure of the silicon-based material or simple formation of a composite of the silicon-based material and other materials is not sufficient to control a reaction and diffusion of lithium ions during intercalation/ deintercalation of the lithium ions.

To compensate for such the volumetric expansion, the silicon-based material can be used in the form of silicon powder, a silicon nanocomposite, or a silicon nanowire, in various nano or micro sizes. Alternatively, the silicon-based material may be used in the form of a composite of silicon and graphite. Alternatively, the silicon-based material may be used in the form of a secondary particle as shown in FIG. 1.

FIG. 1 is a schematic diagram of a structure of an electrode active material 10 according to an exemplary embodiment.

Referring to FIG. 1, the electrode active material 10 includes an electrode active material comprising a secondary particle, the secondary particle comprising a plurality of primary particles of a silicon-containing material 11 (i.e., a silicon-based material), and a carbonaceous material 12, such as a carbon nanotube (CNT) and/or a carbon nanofiber (CNF), wherein a carbonaceous coating layer 13 is disposed on a surface of the electrode active material 10.

Although the silicon-based material having the structure shown in FIG. 1 may have a significantly increased capacity, the capacity may not reach a desired capacity. To obtain a desired capacity, an electrode including the silicon-based material can be cycled at a low voltage, however use of the low voltage can be undesirable.

However, and while not wanting to be bound by theory, it is understood that when the electrode is cycled with a low voltage, an amorphous lithium silicide (a-Li$_x$Si), which is formed during intercalation of lithium ions, may be converted to a crystalline lithium silicide (c-Li$_{3.75}$Si). Such a phase conversion may cause an overvoltage during deintercalation of lithium ions, which results in formation of seed-shaped voids in particles of the silicon-based material. Accordingly, through movement and aggregation of the voids, it is understood that the aggregated voids may then form a solid electrolyte interphase (SEI) layer in the primary particles of the silicon-based material. In this regard, when high-voltage cycling of the electrode is performed 10 times or more, the electrode may have degraded charge/discharge characteristics (e.g., degraded capacity and cycling characteristics).

As a solution to address these problems, a cut-off voltage of the electrode may be adjusted during intercalation/ deintercalation of lithium ions. However, the adjustment of the cut-off voltage of the electrode may undesirably reduce the capacity of the silicon-based material. In addition, to avoid the phase transformation to the crystalline phase to form c-Li$_{3.75}$Si, the cut-off voltage of the electrode can be to be adjusted to be greater than about 50 millivolts (mV). In practice, it is impractical to apply the adjusted cut-off voltage to a full cell including an electrode active material having the primary particles of the silicon-based material.

Figure 2A:
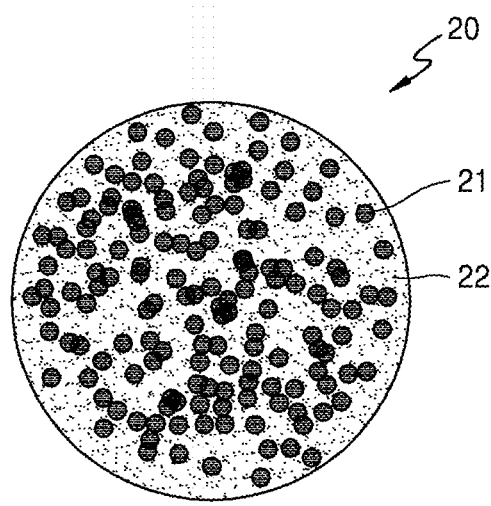
FIG. 2A is a schematic diagram of an electrode active material according to an exemplary embodiment.

FIG. 2A is a schematic diagram of an electrode active material 20 according to an exemplary embodiment.

Referring to FIG. 2A, the electrode active material 20 includes an electrode active material comprising a secondary particle, wherein the secondary particle comprises a plurality of primary particles of a silicon-based material 21, an electrically conductive material (not shown), and a chemically cross-linked water-insoluble polymer 22.

Figure 2B:
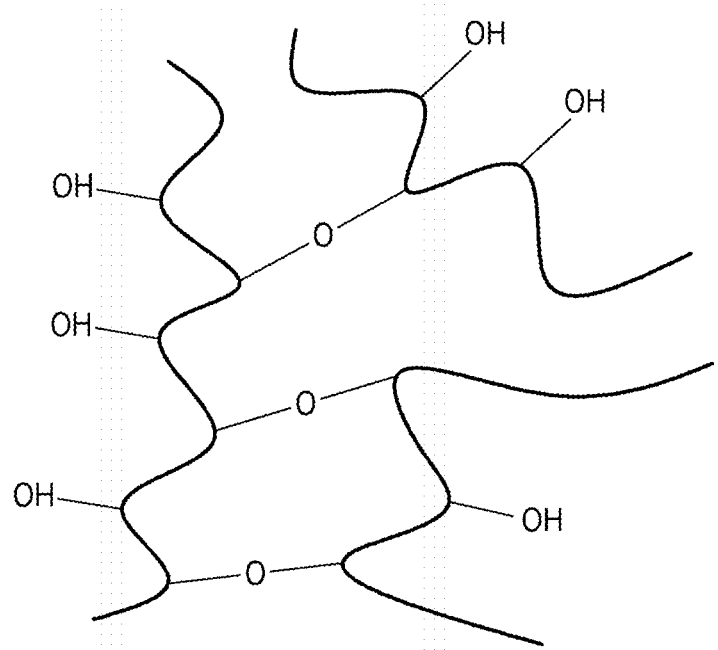
FIG. 2B is a schematic diagram of a structure of a chemically cross-linked water-insoluble polymer included in the electrode active material of FIG. 2A.

FIG. 2B is a schematic diagram of a structure of a chemically cross-linked water-insoluble polymer 22 included in the electrode active material 20 of FIG. 2A according to an exemplary embodiment.

Referring to FIG. 2B, the chemically cross-linked water-insoluble polymer 22 includes polymer chains having cross-linkable functional groups therein, e.g., hydroxyl groups, wherein the polymer chains are linked collectively with each other via a covalent bond, e.g., a C—O—C bond, between a hydroxyl group and a carbon atom. In addition to the C—O—C bond, the covalent bond may include a C(=O)—O—C bond, a C(=O)—NH—C bond, or a C=N—C bond, or other type of bond.

The chemically cross-linked water-insoluble polymer 22 included in the electrode active material 20 may serve as a reaction and diffusion control agent of lithium ions with respect to the plurality of primary particles of the silicon-based material 21.

Figure 2C:
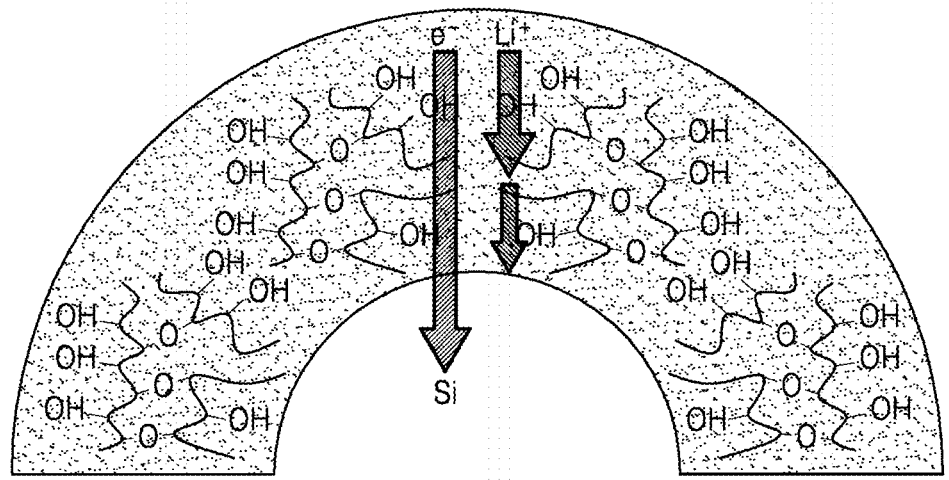
FIG. 2C schematically shows an action associated with the structure of the chemically cross-linked water-insoluble polymer included in the electrode active material of FIG. 2A.

FIG. 2C is a diagram schematically showing an action associated with the structure of the chemically cross-linked water-insoluble polymer 22 included in the electrode active material 20 of FIG. 2A.

Referring to FIG. 2C, the chemically cross-linked water-insoluble polymer 22 may serve as a reaction and diffusion control agent of lithium ions, i.e., a reaction barrier to lithium ions and a diffusion barrier to lithium ions, with respect to the plurality of primary particles of the silicon-based material 21. The chemically cross-linked water-insoluble polymer 22, which is included in secondary particles of the silicon-based material 21, may control a reaction and diffusion of lithium ions with respect to the plurality of primary particles of the silicon-based material 21, regardless of the charge or discharge rate (e.g., C rate) and the degree of depth of intercalation of lithium ions, e.g., the cutoff voltage, thereby exhibiting a similar effect with the adjustment of the cut-off voltage of the electrode. However, the chemically cross-linked water-insoluble polymer 22 does not block electron transport, e.g., does not serve as a reaction barrier of charges (e.g., electrons, $e^-$) or as a diffusion barrier of charges e.g., electrons, $e^-$).

The chemically cross-linked water-insoluble polymer 22 is included in the electrode active material. Although the water-insoluble polymer is formed from an aqueous polymer that is soluble in water or an aqueous solvent and/or is formed from a non-aqueous polymer that is soluble in a non-aqueous solvent, the polymer may be chemically cross-linked to be converted to a water-insoluble polymer. Thus, in terms of manufacturing an electrode including an electrode active material that includes the chemically cross-linked water-insoluble polymer 22, an electrode active material slurry may be used and an additional surface-treatment on the electrode active material may be omitted, wherein the electrode active material slurry comprises an aqueous binder and an electrode active material which comprises the chemically cross-linked water-insoluble polymer 22. In this regard, the electrode may have a structure that does not collapse and provides improved lifespan characteristics.

The chemically cross-linked water-insoluble polymer 22 may be an uncarbonized polymer. The uncarbonized chemically cross-linked water-insoluble polymer 22 may then serve as a reaction barrier of lithium ions and a diffusion barrier of lithium ions, with respect to the plurality of primary particles of the silicon-based material 21. On the other hand, a carbonized chemically cross-linked water-insoluble polymer 22 may facilitate movement of charges, e.g., electrons ($e^-$) through an electrical pathway for charges therein, whereas the carbonized chemically cross-linked water-insoluble polymer 22 does not serve as a reaction barrier to lithium ions or as a diffusion barrier to lithium ions, with respect to the plurality of primary particles of the silicon-based material 21.

The chemically cross-linked water-insoluble polymer 22 may include at least one selected from polyvinyl alcohol, poly(acrylic acid), a poly(acrylic acid) substituted with an alkali cation or ammonium ion, polyimide, polyamideimide, polyvinylidene fluoride, carboxymethyl cellulose, carboxymethyl cellulose sodium salt, carboxymethyl cellulose ammonium salt, methylcellulose, hydroxymethylcellulose, hydroxypropyl cellulose, ethyl cellulose, diacetyl cellulose, polytetrafluoroethylene, polyethylene, and polypropylene. For example, the chemically cross-linked water-insoluble polymer 22 may include least one selected from polyvinyl alcohol, poly(acrylic acid), poly(acrylic acid) substituted with an alkali cation or an ammonium ion, polyimide, carboxymethyl cellulose, and a combination thereof.

The chemically cross-linked water-insoluble polymer 22 may have a weight average molecular weight (Mw) in a range of about 1,000 Daltons (Da) to about 5,000,000 Da, for example, about 10,000 Da to about 200,000 Da. When the weight average molecular weight (Mw) is within the range above, the chemically cross-linked water-insoluble polymer 22 may have an appropriate cross-linking density as well as suitable mechanical flexibility. Thus, the chemically cross-linked water-insoluble polymer 22 may be effective as a reaction barrier to lithium ions and effective as a diffusion barrier to lithium ions, with respect to the plurality of primary particles of the silicon-based material 21.

The electrically conductive material (not shown) may include a carbonaceous material, a metal nanostructure, an electrically conductive polymer, or a combination thereof.

The carbonaceous material may comprise at least one selected from carbon black, natural graphite, artificial graphite, acetylene black, Ketjen black, carbon nanofibers, carbon nanotubes, graphene, and expanded graphite. The graphite may have any suitable form, and may be in the form of particles having any suitable shape, such as platelets or spheres. A particle size of the carbonaceous material, e.g., when analyzed by laser light scattering, may be 10 nm to 1000 nm, 50 nm to 500 nm, or 100 nm to 300 nm.

The metal nanostructure may include at least one selected from gold nanoparticles, copper nanoparticles, nickel nanoparticles, aluminum nanoparticles, silver nanoparticles, titanium nitride (TiN) nanoparticles, gold nanofibers, copper nanofibers, nickel nanofibers, aluminum nanofibers, silver nanofibers, TiN nanofibers, gold nanotubes, copper nanotubes, nickel nanotubes, aluminum nanotubes, silver nanotubes, and TiN nanotubes. A particle size of the metal nanostructure, e.g., when analyzed by laser light scattering, may be 10 nm to 1000 nm, 50 nm to 500 nm, or 100 nm to 300 nm.

The electrically conductive polymer may include at least one selected from polyfluorene, polyphenylene, polypyrene, polypyrrole, polyazulene, polynaphthalene, polycarbazole, polyindole, polyazepine, polyaniline, polythiophene, poly(3,4-ethylenedioxythiophene), poly(p-phenylene sulfide), polyacetylene, poly(p-phenylene vinylene), poly(3,4-ethylenedioxythiophene)-polystyrene sulfonate (PEDOT-PSS), a derivative thereof, and a copolymer thereof. A molecular weight of the electrically conductive polymer may be about 1,000 Da to about 5,000,000 Da, for example, about 10,000 Da to about 200,000 Da.

The primary particles of the silicon-based material 21 may consist essentially of silicon alone, or may comprise a silicon composite.

The plurality of primary particles of the silicon-based material 21 may have an average particle diameter in a range of about 0.1 nanometer (nm) to about 1 micrometer (μm), e.g., about 0.1 nm to about 500 nm, about 10 nm to about 400 nm, or about 20 nm to about 200 nm.

The average particle diameter refers to "D50," which is a value of the particle diameter at 50% in a cumulative distribution curve in which the particles are cumulatively distributed from the smallest to the largest particles, based on 100% of the total number of particles. The D50 may be measured by methods widely known in the art, and for example, may be measured using a particle size analyzer or through an image obtained using a transmission electron microscope (TEM) or a scanning electron microscope (SEM). As another example, the D50 may be measured by using a dynamic light-scattering device, and then, performing data analysis to count the number of particles in each size range, so as to calculate the average particle diameter.

In an embodiment, the plurality of primary particles of the silicon-based material 21 comprises primary particles of a silicon composite. The primary particles of the silicon composite may include a silicon core and a coating layer, the coating layer including an inorganic nanoparticle and disposed on a surface of the silicon core.

The inorganic nanoparticle may include at least one selected from $Al_2O_3$, $TiO_2$, $Li_4Ti_5O_{12}$, $La_2Zr_2O_7$, and $Li_7La_3Zr_2O_{12}$. For example, the inorganic nanoparticle may include $Al_2O_3$. While not wanting to be bound by theory, it is understood that the inorganic nanoparticle may minimize the formation of the SEI layer during charging and discharging of a battery, thereby improving charge and discharge characteristics, including lifespan characteristics.

The inorganic nanoparticle may include a nanosized particle, wherein an average particle diameter thereof may be, for example, about 50 nm or less, or in a range of about 5 nm to about 30 nm. When the average particle diameter of the inorganic nanoparticle is greater than about 50 nm, the coating layer may not be formed. When the average particle diameter of the inorganic nanoparticle is less than about 5 nm, the coating layer may not be formed due to poor dispersion of the inorganic nanoparticle.

The coating layer including the inorganic nanoparticle may have a thickness of about 50 nm or less, for example, a thickness in a range of about 1 nm to about 30 nm. When the coating layer including the inorganic nanoparticle has a thickness within the range above, the transfer of charges, e.g., electrons, and lithium ions, from the surface of the electrode active material into the silicon core electrode active material may be facilitated.

An amount of the inorganic nanoparticle in the coating layer may be, based on 100 parts by weight of the silicon core, in a range of about 1 part by weight to about 30 parts by weight, e.g., about 1 part by weight to about 20 parts by weight, or about 1 part by weight to about 10 parts by weight. When the amount of the inorganic nanoparticle in the coating layer is greater than about 30 parts by weight, based on 100 parts by weight of the silicon core, the coating layer may act as a resistive layer that reduces the performance of a battery. When the amount of the inorganic nanoparticle in the coating layer is less than about 1 part by weight, based on 100 parts by weight of the silicon core, the effect exhibited by the coating layer may be not be sufficient.

The coating layer may further include a metal fluoride. For example, the metal fluoride may include at least one selected from CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$. When the coating layer further includes a metal fluoride, a battery including the electrode active material that includes the coating layer may provide improved lifespan characteristics.

An amount of metal fluoride included in the coating layer may be, based on 100 parts by weight of the silicon core, in a range of about 0.01 part by weight to about 10 parts by weight, e.g., about 0.01 part by weight to about 5 parts by weight, or about 0.01 part by weight to about 3 parts by weight. When the amount of the metal fluoride included in the coating layer is greater than about 10 parts by weight, based on 100 parts by weight of the silicon core, the coating layer may act as a resistive layer that causes reduction in a battery capacity and reduction in the lifespan characteristics of a battery. When the amount of the metal fluoride included in the coating layer is less than about 0.01 part by weight, based on 100 parts by weight of the silicon core, the effect exhibited by the coating layer may be not be sufficient.

The coating layer may include a single layer or multiple layers. In an embodiment, the coating layer may comprise a single layer including the inorganic nanoparticle and/or the metal fluoride. In another embodiment, the coating layer may comprise a plurality of layers including at least one selected from the inorganic nanoparticle, and the metal fluoride, and may comprise 2 to 100 layers, or 4 to 50 layers.

Figure 2D:
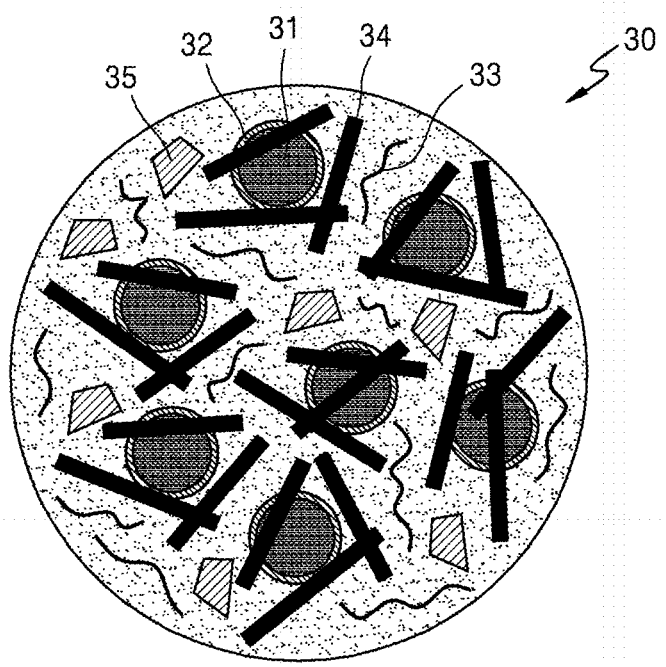
FIG. 2D is a schematic diagram of an electrode active material according to an exemplary embodiment.

FIG. 2D is a schematic diagram of an electrode active material 30 according to an exemplary embodiment.

Referring to FIG. 2D, the electrode active material 30 includes an electrode active material comprising a secondary particle, which comprises a plurality of primary particles of a silicon composite 31, a carbonaceous nanoscaffold 34, and an additional chemically cross-linked water-insoluble polymer 33 that can be the same or different as the chemically cross-linked water-insoluble polymer. In addition, on a surface of the plurality of primary particles of the silicon composite 31, a coating layer 32 comprising an inorganic nanoparticle and/or a metal fluoride may be disposed.

The electrode active material 30 may include the chemically cross-linked water-insoluble polymer 33 as a reaction and diffusion control agent of lithium ions so that a reaction of lithium ions and diffusion of lithium ions with respect to the plurality of primary particles of the silicon composite 31 may be controlled. In addition, the inclusion of the chemically cross-linked water-insoluble polymer 33 in the electrode active material 30 may improve the electrical conductivity of an electrode.

The carbonaceous nanoscaffold 34 may comprise at least one selected from a carbon nanotube, a carbon nanofiber, and a carbon nanowire. In FIG. 2D, the carbonaceous nanoscaffold 34 is disposed on the plurality of primary particles of the silicon composite 31.

The carbon nanotube may comprise at least one selected from a single-walled carbon nanotube, a double-walled carbon nanotube, and a multi-walled carbon nanotube. The carbon nanotube may have an average tube diameter of about 80 nm or less, for example, about 60 nm or less, about 40 nm or less, or about 20 nm, and may have an average tube diameter in a range of about 1 nm to about 80 nm, about 2 nm to about 40 nm, or about 5 nm to about 20 nm. The carbon nanotube may have a length of about 50 μm or less, for example, about 30 μm or less, or a length in a range of about 1 μm to about 50 μm, or about 5 μm to about 30 μm. When the average tube diameter of the carbon nanotube is within the ranges above, the carbon nanotube may provide a sufficient mechanical strength. When the length of the carbon nanotube is within the ranges above, the transfer of charges, e.g., electrons from the surface of the electrode active material 30 into the plurality of primary particles of the silicon composite 31 may be facilitated.

The carbon nanofiber may be in a form of a fiber of a carbon nanowire. The carbon nanowire may have an average wire diameter in a range of about 10 nm to about 500 nm, for example, about 20 nm to about 400 nm, about 20 nm to about 300 nm, about 20 nm to about 200 nm, about 20 nm to about 100 nm, or about 40 nm to about 100 nm. The carbon nanowire may have an average length in a range of about 100 nm to about 100 μm, for example, about 1 μm to about 75 μm, about 0.1 μm to about 50 μm, or about 1 μm to about 20 μm. An aspect ratio of the average length of the carbon nanowire to the average wire diameter of the carbon nanowire may be, for example, 2000:1 at a maximum, for example, 1000:1. When the average wire diameter of the carbon nanowire is within the range above, the carbon nanowire may provide sufficient mechanical strength. When the average length of the carbon nanowire is within the range above, the transfer of charges, e.g., electrons, from the surface of the electrode active material 30 into the plurality of primary particles of the silicon composite 31 may be facilitated.

The electrode active material 30 may further include graphite 35, and the graphite may be in the form of a flake or in the form of a sphere. Spherical graphite 35 may have an average particle diameter in a range of about 1 μm to about 50 μm, for example, about 3 μm to about 30 μm. The average particle diameter refers to "D50," which is a value of particle diameter at 50% in a cumulative distribution curve in which the particles are cumulatively distributed from the smallest to the largest particles, based on 100% of the total number of particles. The D50 may be measured according to the methods described above, and thus further description thereof will be omitted.

The flake or spherical graphite 35 may comprise at least one selected from acetylene black, Ketjen black, natural graphite, artificial graphite, and carbon black. As shown in FIG. 2D, the flake graphite 35 may be disposed between the plurality of primary particles of the silicon composite 31 and/or between the carbonaceous nanoscaffolds 34. The flake or spherical graphite 35 may provide an additional charge transfer path in the electrode active material 30, thereby further improving the electrical conductivity of an electrode.

An amount of the plurality of primary particles of the silicon composite 31 in the electrode active material 30 may be, based on 100 parts by weight of the electrode active material 30, in a range of about 0.1 part by weight to about 99.9 parts by weight, about 1 part by weight to about 99 parts by weight, or about 10 part by weight to about 90 parts by weight.

An amount of the carbonaceous nanoscaffold 34 in the electrode active material 30 may be, based on 100 parts by weight of the electrode active material 30, in a range of about 0.1 part by weight to about 50 parts by weight, about 1 part by weight to about 25 parts by weight, or about 5 part by weight to about 20 parts by weight. However, the amount of the carbonaceous nanoscaffold 34 is not limited thereto, and may be appropriately selected.

A ratio of the amount of the carbonaceous nanoscaffold 34 to the amount of the plurality of primary particles of the silicon composite 31 may be in a range of about 1.1:1 to about 35:1, for example, about 3:1 to about 33:1. When the ratio of the amount of the carbonaceous nanoscaffold 34 to the amount of the primary particles of the silicon composite 31 is within the ranges above, a battery may further have an improved charge and discharge efficiency and an improved capacity retention.

An amount of the chemically cross-linked water-insoluble polymer 33 in the electrode active material 30 may be, based on 100 parts by weight of the electrode active material 30, in a range of about 0.1 part by weight to about 99.9 parts by weight, for example, about 0.1 part by weight to about 90 parts by weight, about 0.1 part by weight to about 80 parts by weight, about 0.1 part by weight to about 70 parts by weight, about 0.2 part by weight to about 60 parts by weight, about 1 part by weight to about 50 parts by weight, about 2 parts by weight to about 40 parts by weight, about 3 part by weight to about 30 parts by weight, or about 5 part by weight to about 30 parts by weight. The amount of the chemically cross-linked water-insoluble polymer 33 in the electrode active material 30 may be selected according to the performance of a desired battery. However, when the amount of the chemically cross-linked water-insoluble polymer 33 in the electrode active material 30 is in a range of about 5 parts by weight to about 30 pars by weight, a battery including the electrode active material 30 that includes the chemically cross-linked water-insoluble polymer 33 may have significantly improved lifespan characteristics.

An amount of the flake or spherical graphite 35 in the electrode active material 30 may be, based on 100 parts by weight of the electrode active material 30, in a range of about 0.1 part by weight to about 50 parts by weight, about 1 part by weight to about 25 parts by weight, or about 5 part by weight to about 20 parts by weight. However, the amount of flake or spherical graphite 35 is not limited thereto, and may be appropriately adjusted according to the performance of a battery.

The electrode active material 20 or 30 may include secondary particles having an average particle diameter in a range of about 1 μm to about 100 μm. For example, the average particle diameter of the electrode active material 20 or 30 may be in a range of about 1 μm 80 μm, for example, about 1 μm to about 60 μm, about 1 μm to about 40 μm, or about 1 μm to about 30 μm. The average particle diameter refers to "D50," which is a value of the particle diameter at 50% in a cumulative distribution curve in which the particles are cumulatively distributed from the smallest to the largest particles based on 100% of the total number of particles. The D50 may be measured according to the methods described above, and thus further description thereof will be omitted.

The electrode active material 20 or 30 shows a differential capacity (dQ/dV) peak with respect to $Li/Li^+$ at an operating potential in a range of about 200 millivolts (mV) to about 600 mV, wherein the dQ/dV peak may be increased by at least 1 mV compared to a peak of an electrode active material that does not include the chemically cross-linked water-insoluble polymer 22 or 33.

In the electrode active material 20 or 30, the dQ/dV peak with respect to $Li/Li^+$ at an operating potential in a range of about 200 mV to about 600 mV may appear as a single peak or in an "M" shape consisting of two peaks.

The electrode active material 20 or 30 shows a dQ/dV peak with respect to $Li/Li^+$ at an operating potential in a range of about 200 mV to about 600 mV, wherein the dQ/dV peak may have a full width at half maximum in a range of about 1 mV to about 400 mV.

Figure 5B:
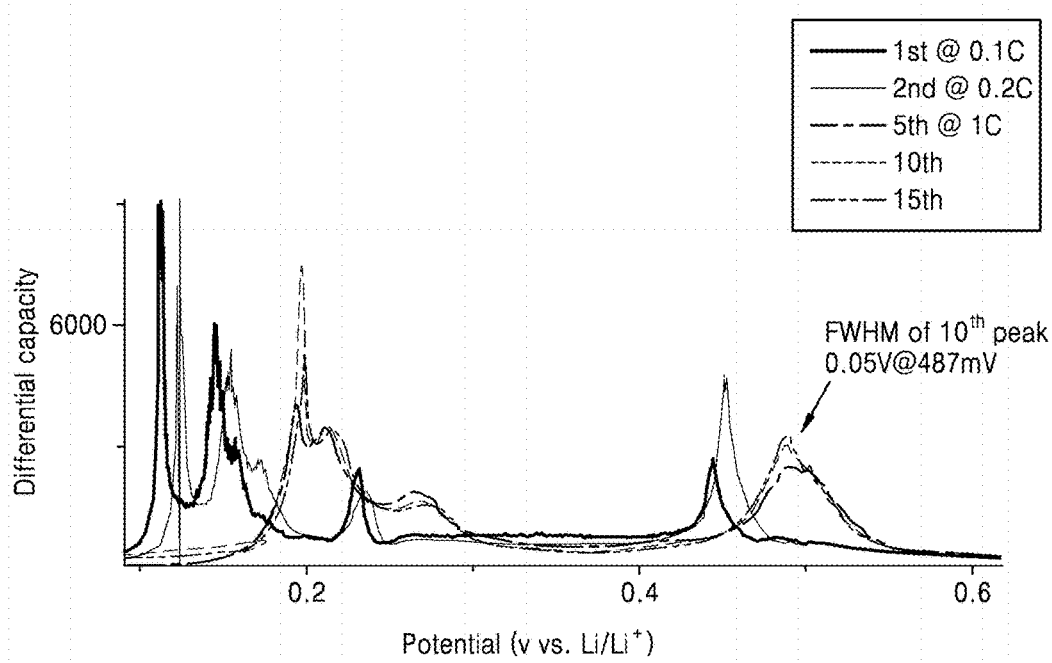
FIG. 5B is a graph of differential capacity (dQ/dV, milliampere-hours per gram-volts (mAh/gV)) versus potential (volts versus $Li/Li^+$, V) and is a dQ/dV profile through a $15^{th}$ cycle of a lithium secondary battery prepared according to Example 7 with respect to $Li/Li^+$ at a part of an operating potential in a range of about 0 mV to about 600 mV.
Figure 5C:
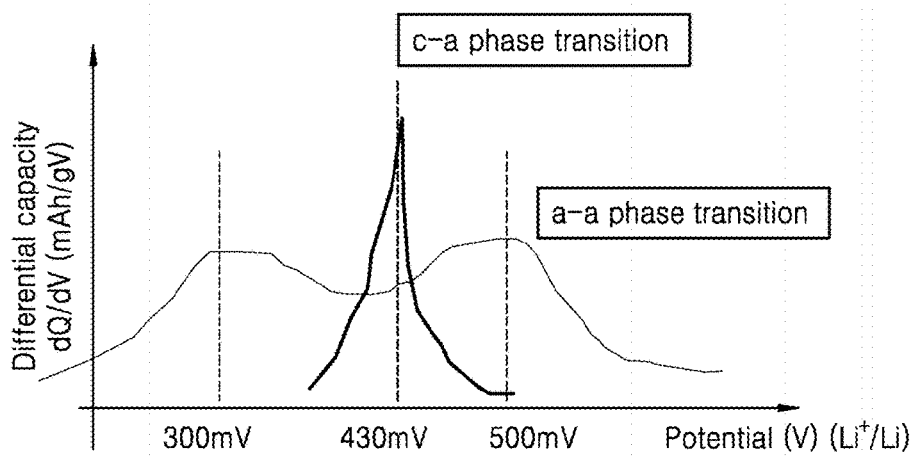
FIG. 5C is a graph of differential capacity (dQ/dV, milliampere-hours per gram-volts (mAh/gV)) versus potential (volts versus $Li/Li^+$, V) and is a dQ/dV profile of a lithium secondary battery including an electrode active material according to an exemplary embodiment with respect to Li/Li+ at an operating potential in a range of about 250 mV to about 550 mV.

FIG. 5C shows a dQ/dV profile of a lithium secondary battery including an electrode active material according to an exemplary embodiment with respect to $Li/Li^+$ at an operating potential in a range of about 250 mV to about 550 mV.

Referring to FIG. 5C, an electrode active material according to an exemplary embodiment shows a dQ/dV peak with respect to $Li/Li^+$ at an operating potential in a range of about 200 mV to about 600 mV, wherein the dQ/dV peak appears in an M shape consisting of two peaks with respect to $Li/Li^+$ at an operating potential in a range of about 300 mV to about 500 mV. For reference, the dQ/dV peak that appears as a single peak with respect to $Li/Li^+$ at an operating potential of about 430 mV and that has a narrow half-width represents a peak of an electrode active material that does not include the chemically cross-linked water-insoluble polymer.

That is, when comparing the dQ/dV peak of the electrode active material that includes the chemically cross-linked water-insoluble polymer according to an exemplary embodiment with the dQ/dV peak of the electrode active material that does not include the chemically cross-linked water-insoluble polymer according to an exemplary embodiment, it is confirmed that the electrode active material including the chemically cross-linked water-insoluble polymer according to an exemplary embodiment does not undergo a phase conversion to a crystalline lithium silicide (c-$Li_{3.75}Si$) during intercalation of lithium ions while maintaining an amorphous lithium silicide (a-$Li_xSi$). Following deintercalation of lithium ions, the primary particles of the amorphous silicon-based material are maintained without having voids. Accordingly, the electrode active material including the chemically cross-linked water-insoluble polymer according to an exemplary embodiment may have improved capacity and cycle characteristics.

An electrode according to another aspect may include the electrode active material. The electrode active material may be a positive active material or a negative active material. For example, the electrode active material may be a negative active material.

A secondary battery according to another aspect may include the electrode. The electrode may be a positive electrode or a negative electrode. For example, the electrode may be a negative electrode.

The secondary battery may be a lithium-ion secondary battery, a lithium-sulfur secondary battery, or a lithium-air secondary battery. For example, the secondary battery may be a lithium secondary battery, the lithium secondary battery including: a negative electrode including the electrode active material; a positive electrode facing the negative electrode and an electrolyte disposed between the negative electrode and the positive electrode.

The positive electrode may be prepared as follows. A positive active material, an electrically conductive material, a binder, and a solvent may be mixed together to prepare a composition for forming a positive electrode slurry. The composition for forming the positive electrode slurry may be directly coated on a positive current collector, and dried, thereby preparing a positive electrode on which a positive active material layer is formed. Alternatively, a positive electrode on which a positive active material layer is formed may be prepared by casting the composition for forming the positive electrode slurry on a separate support to form a positive active material film, which may then be separated from the support and laminated on a positive current collector.

As the positive active material, any lithium-containing metallic oxide commercially used in the art may be used without particular limitation. For example, the positive active material may include at least one composite oxide of lithium and a metal selected from cobalt (Co), manganese (Mn), nickel (Ni), and a combination thereof. For example, the positive active material may include a compound represented by a formula such as $Li_aA_{1-b}B'_bD'_2$ (where $0.90 \leq a \leq 1$ and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In formulas above, A may comprise at least one selected from Ni, Co, and Mn; B' may comprise at least one selected from aluminum (Al), Ni, Co, Mn, chromium (Cr), iron (Fe), magnesium (Mg), strontium (Sr), vanadium (V), and a rare earth element; D' may comprise at least one selected from oxygen (O), fluorine (F), sulfur (S), and phosphorus (P); E may comprise at least one selected from Co, and Mn; F' may comprise at least one selected from F, S, and P; G may comprise at least one selected from Al, Cr, Mn, Fe, Mg, lanthanum (La), cerium (Ce), Sr, and V; Q may comprise at least one selected from titanium (Ti), molybdenum (Mo), and Mn; I' may comprise at least one selected from Cr, V, Fe, Sc, and yttrium (Y); and J may comprise at least one selected from V, Cr, Mn, Co, Ni, and copper (Cu).

For example, the compound may have a coating layer on a surface thereof, or the compound and a compound having a coating layer may be used as a mixture. The coating layer may include a compound of a coating element, such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may comprise at least one selected from Mg, Al, Co, potassium (K), sodium (Na), calcium (Ca), silicon (Si), Ti, V, tin (Sn), germanium (Ge), gallium (Ga), boron (B), arsenic (As), and zirconium (Zr). A formation process (e.g., spray coating or dip-coating) of the coating layer may be any suitable coating method that does not adversely affect physical properties of the positive material by using the elements above, and the coating method may be selected by those of ordinary skill in the art without undue experimentation. Thus, further description of the coating method will be omitted in the present specification.

Examples of the conductive material comprise at least one selected from carbon fiber, such as carbon black, graphite particles, natural graphite, artificial graphite, acetylene black, and Ketjen black; carbon nanotube; a metal powder, a metal fiber, and a metal tube, such as at least one selected from Cu, Ni, Al, and silver (Ag), and an electrically conductive polymer, such as a polyphenylene derivative, but are not limited thereto. Any material suitable as a conductive material in the art may be used.

Examples of the binder include at least one selected from a polyvinylidene fluoride/hexafluoropropylene copolymer, polyvinylidene fluoride, polyacrylonitrile, polymethyl methacrylate, polytetrafluoroethylene (PTFE), and a styrene-butadiene rubber-based polymer. Examples of the solvent include N-methylpyrrolidone (NMP), acetone, and water, but are not limited thereto. Any material suitable as a binder and a solvent in the art may be used.

If desired, a plasticizer may be further added to the composition for forming the positive electrode to thereby form apertures inside an electrode plate.

Amounts of the positive active material, the conductive agent, the binder, and the solvent are similar to those commercially used in the art of lithium secondary batteries. Depending on the use and features of the lithium battery, at least one of the conductive agent, the binder, and the solvent may be omitted.

The positive current collector may be prepared to have a thickness in a range of about 3 μm to about 500 μm. The positive current collector may be made of any suitable material available in the art without particular limitation, the material causing no unsuitable chemical change in batteries, and having suitable electrical conductivity. For example, the positive current collector may comprise at least one selected from copper, stainless steel, aluminum, nickel, titanium, sintered carbon, copper or stainless steel surface treated with carbon, nickel, titanium, silver, and an aluminum-cadmium alloy. In addition, fine uneven structures may be formed on a surface of the positive current collector to enhance a binding strength of the positive current collector to the positive active material. The positive current collector may be used in various forms, such as film, sheet, foil, net, porous body, formed body, and non-woven fabric.

The positive electrode may have a mixing density of at least 2.0 g/cc.

Also, the negative electrode may be prepared as follows. The negative electrode may be prepared in the same manner as in the preparation of the positive electrode, except that a negative active material is used instead of the positive active material. In addition, when preparing a composition for forming a negative electrode slurry, the electrically conductive agent, the binder, and the solvent may be the same as those defined in connection with the preparation of the positive electrode.

For example, the negative active material, the binder, and the solvent may be mixed together to prepare a composition for forming a negative electrode slurry. Here, the conductive agent may be optionally mixed therewith. The composition for forming the negative electrode slurry may be directly coated on a negative current collector, thereby preparing a negative electrode. Alternatively, a negative electrode may be prepared by casting the composition for forming the positive electrode slurry on a separate support to form a negative active material film, which may then be separated from the support and laminated on a negative current collector.

As the negative active material, the above-described electrode active material may be used. In addition, the negative active material may include, in addition to the above-described electrode active material, any material suitable as the negative active material used in the art of lithium secondary batteries. For example, the negative active material may include at least one selected from the group consisting of a lithium metal, a metal alloyable with lithium, a transition metal oxide, a non-transition metal oxide, and a carbonaceous material.

For example, the metal alloyable with lithium may be Si, Sn, Al, Ge, lead (Pb), bismuth (Bi), antimony (Sb), a Si—Y' alloy (where Y' is an alkali metal, an alkaline earth metal, a Group 13 element, a Group 14 element, a transition metal, a rare earth element, or a combination thereof, and is not Si), or a Sn—Y' alloy (where Y' is an alkali metal, an alkaline earth metal, a Group 13 element, a Group 14 element, a transition metal, a rare earth element, or a combination thereof, and is not Sn). The element Y' may include Mg, Ca, Sr, barium (Ba), radium (Ra), scandium (Sc), Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), zinc (Zn), cadmium (Cd), B, Al, Ga, Sn, indium (In), Ge, P, As, Sb, Bi, S, selenium (Se), telenium (Te), polonium (Po), or a combination thereof.

For example, the transition metal oxide may include a lithium titanate oxide, a vanadium oxide, or a lithium vanadium oxide.

For example, the non-transition metal oxide may include $SnO_2$ or $SiO_x$ (where $0<x<2$).

The carbonaceous material may include crystalline carbon, amorphous carbon, or a combination thereof. Examples of the crystalline carbon include natural graphite or artificial graphite that is in amorphous, plate, flake, spherical, or fibrous form. Examples of the amorphous carbon include soft carbon (e.g., carbon sintered at low temperatures), hard carbon, meso-phase pitch carbides, or sintered corks, and the like.

Amounts of the negative active material, the electrically conductive agent, the binder, and the solvent are similar to those generally used in the art of lithium secondary batteries.

The negative current collector may be prepared to have a thickness in a range of about 3 μm to about 500 μm. The negative current collector may be made of any suitable material available in the art without particular limitation, the material causing no undesirable chemical change in batteries, and having suitable electrical conductivity. For example, the negative current collector may comprise at least one selected from copper, stainless steel, aluminum, nickel, titanium, sintered carbon, copper or stainless steel surface treated with carbon, nickel, titanium, silver, and an aluminum-cadmium alloy. In addition, fine uneven structures may be formed on a surface of the negative current collector to enhance a binding strength of the negative current collector to the negative active material. The negative current collector may be used in various forms, such as film, sheet, foil, net, porous body, formed body, and non-woven fabric.

Then, a separator to be disposed between the positive electrode and the negative electrode is prepared. The separator used herein may be any suitable separator used in the art of lithium batteries. In particular, a separator with low resistance against ionic movement of electrolytes and an excellent electrolyte-wetting capacity may be used. For example, the separator may be selected from glass fiber, polyester, Teflon, polyethylene, polypropylene, polytetrafluoroethylene (PTFE), or a combination thereof, and may be in the form of a woven or a non-woven fabric. The separator used herein may have a pore diameter in a range of about 0.01 μm to about 10 μm, and a thickness in a range of about 5 μm to about 300 μm.

A non-aqueous electrolyte containing a lithium salt includes a non-aqueous and lithium, and the non-aqueous electrolyte may include a non-aqueous electrolyte, an organic solid electrolyte, or an inorganic solid electrolyte.

The non-aqueous electrolyte may include, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid trimesters, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

The organic solid electrolyte may include, for example, a polyethylene derivative, a polyethylene oxide derivative, a polypropylene oxide derivative, a phosphoric acid ester polymer, polyagitation lysine, polyester sulfide, polyvinyl alcohol, polyvinylidene fluoride, or a polymer including an ionic dissociable group.

The inorganic solid electrolyte may include, for example, nitride, halide, or sulfate of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may include any lithium salt commercially used in the art of lithium secondary batteries, and examples of the lithium salt that is easily dissolved in the non-aqueous electrolyte include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, low aliphatic carbonic acid lithium, 4 phenyl boric acid lithium, or imide.

Lithium secondary batteries may be categorized as lithium ion secondary batteries, lithium ion polymer secondary batteries, and lithium polymer secondary batteries, according to the separator and the electrolyte used. Lithium secondary batteries may also be categorized as cylindrical batteries, square-shaped batteries, coin-shaped batteries, or pouch-shaped batteries, according to the shape thereof. Lithium secondary batteries may also be categorized as bulk-type batteries or thin film-type batteries, according to the size thereof.

Methods of manufacturing lithium secondary batteries are widely known in the art, and thus the description of the methods will be omitted in the present specification.

Figure 4:
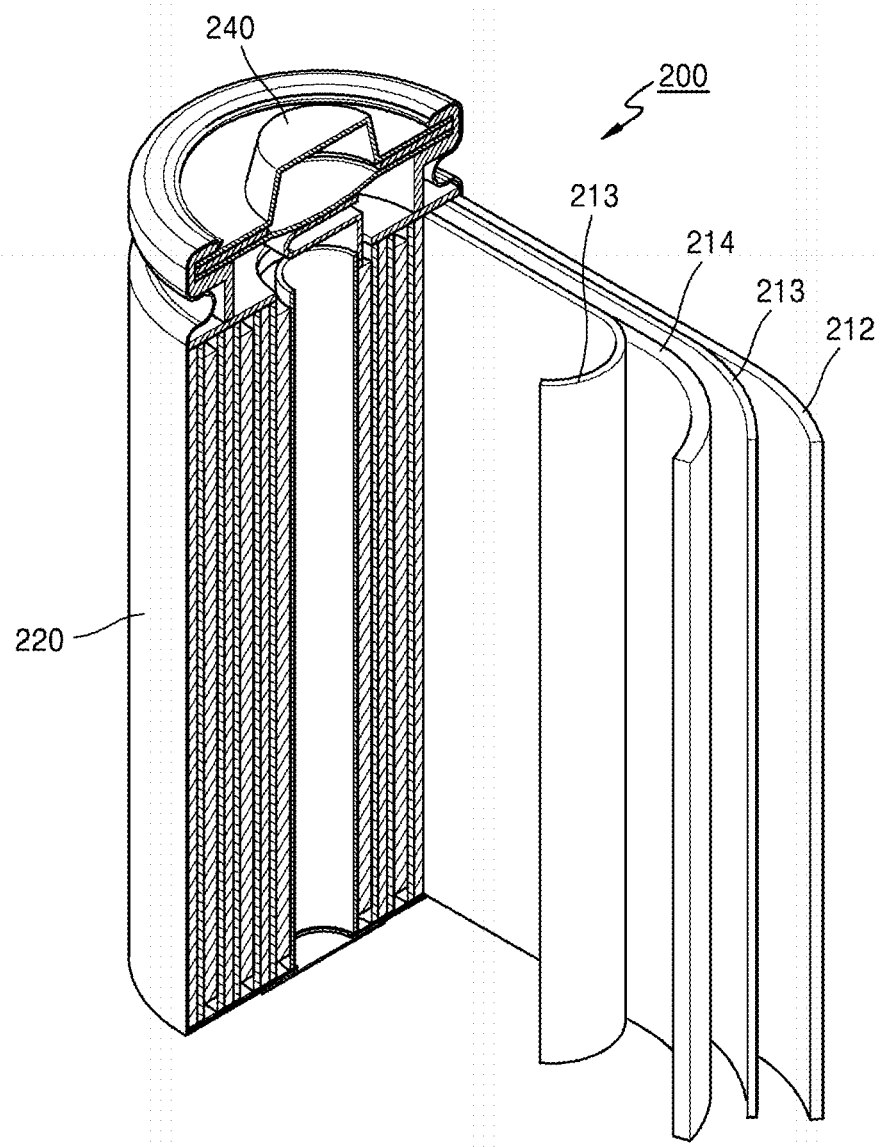
FIG. 4 is a schematic diagram of a structure of a lithium secondary battery according to an exemplary embodiment.

FIG. 4 is a schematic diagram of a structure of a lithium secondary battery 200 according to an exemplary embodiment.

As shown in FIG. 4, the lithium secondary battery 200 includes a positive electrode 214, a separator 213, and a negative electrode 212. The positive electrode 214, the separator 213, and the negative electrode 212 are wound or folded to be received into a battery container 220. Then, an organic electrolyte is introduced into the battery container 220, and sealed with a sealing element 240, thereby completing a manufacture of the lithium battery 200. The battery container 220 may be cylindrical, rectangular-shaped, or thin film-shaped. For example, the lithium battery 200 may be a large thin film battery. The lithium battery 200 may be, for example, a lithium ion secondary battery.

Also, the separator 213 may be disposed between the positive electrode 214 and the negative electrode 212, thereby forming an electrode assembly. Once the electrode assembly is laminated in a bicell structure, an organic electrolyte may be impregnated thereinto, and the resulting product is put into a pouch and sealed, thereby completing the manufacture of a lithium ion polymer secondary battery.

Furthermore, a plurality of electrode assemblies may be laminated to form a battery pack, and thus the formed battery pack may be used in all devices requiring high capacity and high power, for example, notebooks, smartphones, electrically-drive tools, and electric vehicles.

In addition, the lithium secondary battery may be have excellent storage stability, lifespan characteristics, and high efficiency characteristics at high temperatures, and thus may be useful in an electric vehicle (EV). For example, the lithium secondary battery may be applied to a hybrid electric vehicle, such as a plug-in hybrid electric vehicle (PHEV).

In the lithium secondary battery according to exemplary embodiments, the above-described electrode active material may be used as the negative active material. However, in a lithium sulfur secondary battery according to exemplary embodiments, the above-described electrode active material may be used as the positive active material.

According to another aspect, a method of preparing the electrode active material includes: obtaining secondary particles by aggregating a slurry, the slurry including a plurality of primary particles of a silicon-based material and an electrically conductive material; and injecting a solution for forming a chemically cross-linked water-insoluble polymer to the secondary particles, followed by performing a heat treatment, to obtain the secondary particle-type electrode active material.

For example, a method of preparing an electrode active material may comprise contacting a plurality of primary particles of a silicon-containing material, an electrically conductive material, and a solvent to form a slurry; mixing the slurry to aggregate the primary particles and the electrically conductive material to form secondary particles comprising the primary particles and the electrically conductive material; providing a solution for forming a chemically cross-linked water-insoluble polymer; contacting the slurry comprising the secondary particles and the solution for forming the chemically cross-linked water-insoluble polymer to form a mixture; and heat treating the mixture to obtain the electrode active material.

The slurry including the plurality of primary particles of the silicon-based materials and the electrically conductive material may be aggregated to obtain the secondary particles.

The obtaining of the secondary particles may be performed by stirring and aggregating the slurry including the plurality of primary particles of the silicon-based material and the electrically conductive material. Here, the slurry may further include a binder. The electrically conductive material used herein may comprise at least one selected from a carbonaceous nanoscaffold, and flake or spherical graphite. The slurry may further include inorganic nanoparticles.

The obtaining of the secondary particles by stirring and aggregating the slurry including the plurality of primary particles of the silicon-based material and the electrically conductive material may be performed as follows.

First, the carbonaceous nanoscaffold, the flake or spherical graphite, and the binder are added to a solvent to form a first mixture. The first mixture is subjected to a first ultrasonic stirring step and/or a first mechanical stirring step, for a sufficiently enough period of time (e.g., about 1 to 3 hours), thereby obtaining a first mixed slurry.

The binder used herein may be a polymer that is identical to or different from the chemically cross-linked water-insoluble polymer. Configurations, types, and amounts of the carbonaceous nanoscaffold, the binder, and the solvent are the same as those defined above, and thus the description thereof will be omitted in the following exemplary embodiments. In the secondary particle-type electrode active material prepared according to a mixing weight ratio of the binder to a mixing weight ratio of the carbonaceous nanoscaffold, the porosity therein may be appropriately adjusted according to battery performance of a desired battery.

Then, the plurality of primary particles of the silicon-based material, e.g., the silicon powder alone, are added to the first mixed slurry to form a second mixture. The second mixture is subjected to second ultrasonic stirring step and/or a second mechanical stirring step, for a sufficiently enough period of time (e.g., about 1 to 3 hours), thereby obtaining a second mixed slurry.

The plurality of primary particles of the silicon-based material may include silicon alone or primary particles of a silicon composite. For example, the primary particles of the silicon composite may include a silicon core and a coating layer, wherein the silicon core is impregnated into a coating solution containing inorganic nanoparticles to thereby obtain the coating layer including inorganic nanoparticles disposed on a surface of the silicon core.

Configurations, types, and amounts of the plurality of primary particles of the silicon-based material are the same as those defined above, and thus the description thereof will be omitted in the following exemplary embodiments.

An amount of solid content in the second mixed slurry may be in a range of about 1 to about 50 weight %, e.g., about 2 to about 40 weight % or about 3.0 to about 30 weight %, based on the total weights of the first mixed slurry and the second mixed slurry. The term "amount of solid content" as used herein refers to an amount of a solid material in terms of percentage with respect to the total weights of the slurries including the plurality of primary particles of the silicon-based material, the binder, the carbonaceous nanoscaffold, the flake or spherical graphite, the inorganic nanoparticles, and the solvent, wherein the solid material denotes a solid material being left in the slurry after the solvent is removed therefrom.

The second mixed slurry may be spray-dried to obtain the secondary particles. A spray dryer used herein may be any spray dryer typically available in the art, and for example, may be an ultrasonic spray dryer, an air nozzle spray dryer, an ultrasonic nozzle spray dryer, a filter expansion aerosol generator, or an electrostatic spray dryer, but the spray dryer is not limited thereto. The second mixed slurry may be sprayed through a disc rotating at a high speed in a spray chamber at a temperature in a range of about 50° C. to about 300° C., and the spraying and the drying may be performed in the same chamber in an inert atmosphere, such as the atmosphere filled with nitrogen gas. Here, the second mixed slurry may have a flow velocity in a range of about 1 mL/min to about 100 mL/min. However, to obtain the solid content of the second mixed slurry, the spray-drying conditions may be appropriately adjusted by controlling flux and flow velocity of the second mixed slurry, sintering temperatures, residence time in the spray chamber, internal pressures, or the like.

In addition, following the spray-drying of the second mixed slurry, the second mixed slurry may be additionally subjected to a sintering process at a temperature in a range of about 600° C. to about 1,100° C., e.g., about 700° C. to about 1,000° C., in an inert atmosphere (e.g., the inert atmosphere filled with an inert gas such as nitrogen) for about 1 to about 5 hours.

In addition, the obtaining of the second particles by using the second mixed slurry may be performed by, in addition to the spray-drying method, any method used for obtaining secondary particles in the art.

Then, the solution for forming the chemically cross-linked water-insoluble polymer may be added to the obtained secondary particles to form a mixture, followed by performing a heat treatment on the mixture, thereby preparing the secondary particle-type electrode active material.

The solution for forming the chemically cross-linked water-insoluble polymer may include a monomer including at least one chemically cross-linkable functional group selected from a hydroxyl group, an aldehyde group, a carboxyl group, an amine group, and an amide group. For example, the monomer may include a monomer of vinyl alcohol, a monomer of acrylic acid, a monomer of imide, a monomer of carboxylmethyl cellulose, or a combination thereof.

An amount of the monomer including the chemically cross-linked functional group in the secondary particle-type electrode active material may be, based on 100 parts by weight of the secondary particle-type electrode active material, in a range of about 0.1 to about 99.9 parts by weight, e.g., about 0.1 to about 90 parts by weight, about 0.1 to about 80 parts by weight, about 0.1 to about 70 parts by weight, about 0.2 to about 60 parts by weight, about 1 to about 50 parts by weight, about 2 to about 40 parts by weight, about 3 to about 30 parts by weight, or about 5 to about 30 parts by weight. The amount of the monomer including the chemically cross-linked functional group in the secondary particle-type electrode active material may be appropriately adjusted according to the performance of a desired battery. However, when the amount of the monomer including the chemically cross-linked functional group in the secondary particle-type electrode active material is in a range of about 5 to about 30 parts by weight, a battery including the secondary particle-type electrode active material may have significantly improved lifespan characteristics.

If desired, a cross-linking agent and/or a polymerization initiator may be additionally added to the solution for forming the chemically cross-linked water-insoluble polymer. If desired, an emulsifier or a dispersant may be additionally added to the solution for forming the chemically cross-linked water-insoluble polymer.

The cross-linking agent may include, for example, a polyhydric alcohol or a polyhydric epoxy compound. Examples of the polyhydric alcohol include an aliphatic polyhydric alcohol, such as ethylene glycol, glycerin, and polyvinylalcohol, and an aromatic polyhydric alcohol, such as pyrocatechol, resorcinol, and hydroquinone. Examples of the polyhydric epoxy compound include an aliphatic polyhydric epoxy compound, such as glyceryl polyglycidyl ether and trimethylolpropane polyglycidyl ether, and an aromatic polyhydric epoxy compound, such as a bisphenol A-type epoxy compound. However, examples of the cross-linking agent are not limited thereto, and any cross-linking agent capable of cross-linking a monomer including the chemically cross-linked functional group may be used. The cross-linking agent may be used to appropriately adjust a cross-linking density, and accordingly, may improve a strength and stability of the secondary particle-type electrode active material.

In the secondary particle-type electrode active material prepared according to types and cross-linking density of the monomer including the chemically cross-linked functional group, the chemically cross-linked water-insoluble polymer may function to appropriately control the degree of the reaction and diffusion of lithium ions with respect to the plurality of primary particles of the silicon-based material.

An amount of the cross-linking agent may be, for example, in a range of about 1 to about 40 weight %, based on the total weight of the monomer including the chemically cross-linked functional group.

Examples of the polymerization initiator include an organic peroxide, such as lauryl peroxide, diisopropyl peroxydicarbonate, di-2-ethylhexyl peroxydicarbonate, t-butyl peroxypivalate, and 3,3,5-trimethylhexanoyl peroxide; an azo compound, such as α, α'-azobisisobutyronitrile; ammonium persulfate; and potassium persulfate. The polymerization initiator may be used alone or in combination of two or more types of polymerization initiators at any ratio. However, the polymerization initiator is not particularly limited, and any polymerization initiator capable of performing thermal polymerization on the monomer including chemically cross-linked functional group may be used.

An amount of the polymerization initiator may be similar to that commercially used during thermal polymerization. Temperatures and times required for polymerization may be determined according to polymerization methods and types of the polymerization initiator. In general, the temperature at which polymerization is performed may be about 30° C. or higher while the time for which polymerization is performed may be in a range of about 0.5 to about 30 hours. In addition, an amine-based additive may be used as a polymerization auxiliary. In addition, an electrically conductive agent, an emulsifier, or a dispersant may be used in amounts that are similar to those used during thermal polymerization.

The heat treatment may be performed at a temperature of less than 600° C., e.g., about 300° C. or less. For example, the heat treatment may be performed at a temperature of about 200° C. For example, the heat treatment may be performed for about 1 to about 12 hours, but such conditions may be appropriately changed. The treatment may be performed in the air or in an oxidizing atmosphere. Following the heat treatment, the secondary particle-type electrode active material in which an uncarbonized chemically cross-linked water-insoluble polymer is formed may be obtained. Here, the secondary particle-type electrode active material may be insoluble. Then, the obtained secondary particle-type electrode active material may be dried-cooled in a furnace.

Hereinafter, the present inventive concept will be described in further detail with reference to the following examples. However, these examples are for illustrative purposes only and are not intended to limit the scope of the present inventive concept.

EXAMPLES

Example 1

Preparation of an Electrode Active Material

About 5 parts by weight of a multi-walled carbon nanotube (MWCNT) (manufactured by CNT Co., Ltd, and having purity of 97% or greater, an average tube diameter of 20 nm, and an average tube length in a range of about 1 μm to about 25 μm), about 50 parts by weight of graphite powder (manufactured by SEC Carbon Ltd (e.g., SGP-1) and having an average particle diameter of about 4 μm), and about 10 parts by weight of polyvinyl alcohol (PVA) (manufactured by Sigma-Aldrich and having a weight average molecular weight Mw in a range of about 31,000 to about 51,000), based on 100 parts by weight of an electrode active material, were mixed to prepare a PVA aqueous solution. The prepared PVA aqueous solution was subjected to a first ultrasonic dispersion for about 1 hour, thereby obtaining a first mixed slurry.

About 35 parts by weight of silicon powder (having an average particle diameter of about 150 μm), based on 100 parts by weight of an electrode active material, was added to the first mixed slurry, followed by a second ultrasonic dispersion for about 1 hour, thereby obtaining a second mixed slurry. Here, an amount of solid content in the second mixed slurry was about 15 weight % based on the total weights of the first mixed slurry and the second mixed slurry.

The second mixed slurry was spray-dried with nitrogen gas sprayed in 60 liters/minutes by using a spray dryer (Mini Spray Dryer B-290 manufactured by BUCHI, a two-fluid nozzle type) at a temperature of about 220° C., thereby preparing composite particles including the silicon powder, the MWCNT, the graphite powder, and the PVA. Then, the composite particles were subjected to a sintering process at a temperature of about 750° C. for about 12 hours in a nitrogen gas atmosphere, thereby obtaining secondary particles.

An aqueous solution was prepared by adding and dissolving a MWCNT in about 5 parts by weight of PVA (manufactured by Sigma-Aldrich and having a weight average molecular weight Mw of about 130,000) based on 100 parts by weight of the obtained secondary particles to have an amount of solid content therein of about 2 weight %. By slowly raising ambient temperature and pressure, the aqueous solution was sufficiently infiltrated into the secondary particles. Afterwards, the secondary particles were exhausted using a rotary vacuum evaporation device while slowly raising ambient temperature, thereby removing and evaporating water in the secondary particles. Then, the secondary particles from which water was removed were subjected to a heat treatment in the air at a temperature of about 200° C. for about 2 hours. Consequently, a secondary particle-type electrode active material, in which uncarbonized, insoluble, and chemically cross-linked PVA was formed, was prepared.

Example 2

Preparation of an Electrode Active Material

A secondary particle-type electrode active material, in which uncarbonized, insoluble, and chemically cross-linked PVA was formed, was prepared in the same manner as in Example 1, except that an aqueous solution, which was prepared by adding a MWCNT to about 10 parts by weight of PVA, instead of about 5 parts by weight of PVA, (manufactured by Sigma-Aldrich and having a weight average molecular weight Mw of about 130,000) based on 100 parts by weight of the obtained secondary particles to have solid content therein of about 2 weight %, was sufficiently infiltrated into the secondary particles by slowly raising ambient temperature and pressure.

Example 3

Preparation of an Electrode Active Material

A secondary particle-type electrode active material, in which uncarbonized, insoluble, and chemically cross-linked PVA was formed, was prepared in the same manner as in Example 1, except that an aqueous solution, which was prepared by adding a MWCNT to about 20 parts by weight of PVA, instead of about 5 parts by weight of PVA, (manufactured by Sigma-Aldrich and having a weight average molecular weight Mw of about 130,000) based on 100 parts by weight of the obtained secondary particles to have solid content therein of about 2 weight %, was sufficiently infiltrated into the secondary particles by slowly raising ambient temperature and pressure.

Example 4

Preparation of an Electrode Active Material

About 10 parts by weight of a MWCNT (manufactured by CNT Co., Ltd, and having purity of 97% or greater, an average tube diameter of 20 nm, and an average tube length in a range of about 1 µm to about 25 µm), about 45 parts by weight of graphite powder (manufactured by SEC Carbon Ltd (e.g., SGP-1) and having an average particle diameter of about 4 µm), and about 10 parts by weight of PVA (manufactured by Sigma-Aldrich and having a weight average molecular weight Mw in a range of about 31,000 to about 51,000), based on 100 parts by weight of an electrode active material, were mixed to prepare a PVA aqueous solution. The prepared PVA aqueous solution was subjected to a first ultrasonic dispersion for about 1 hour, thereby obtaining a first mixed slurry.

About 35 parts by weight of silicon powder (having an average particle diameter of about 150 µm), based on 100 parts by weight of an electrode active material, was added to the first mixed slurry, followed by a second ultrasonic dispersion for about 1 hour, thereby obtaining a second mixed slurry. Here, an amount of solid content in the second mixed slurry was about 15 weight % based on the total weights of the first mixed slurry and the second mixed slurry.

The second mixed slurry was spray-dried with nitrogen gas sprayed in 60 liters/minutes by using a spray dryer (Mini Spray Dryer B-290 manufactured by BUCHI, a two-fluid nozzle type) at a temperature of about 220° C., thereby preparing composite particles including the silicon powder, the MWCNT, the graphite powder, and the PVA. Then, the composite particles were subjected to a sintering process at a temperature of about 750° C. for about 12 hours in a nitrogen gas atmosphere, thereby obtaining secondary particles.

An aqueous solution was prepared by adding and dissolving a MWCNT in about 10 parts by weight of N-methyl-2-pyrrolidone based on 100 parts by weight of the obtained secondary particles to have an amount of solid content therein of about 2 weight %, wherein N-methyl-2-pyrrolidone was prepared by dissolving poly(amid acid) (available by Samsung Fine Chemicals Co., Ltd and having a weight average molecular weight Mw in a range of about 30,000 to about 60,000) therein. By slowly raising ambient temperature and pressure, the aqueous solution was sufficiently infiltrated into the secondary particles. Afterwards, the secondary particles were exhausted using a rotary vacuum evaporation device while slowly raising ambient temperature, thereby removing and evaporating N-methyl-2-pyrrolidone contained in the secondary particles. Then, the secondary particles from which N-methyl-2-pyrrolidone was removed were subjected to a heat treatment in the air at a temperature of about 200° C. for about 2 hours. Consequently, a secondary particle-type electrode active material, in which uncarbonized, insoluble, and chemically cross-linked PVA was formed, was prepared.

Example 5

Preparation of an Electrode Active Material

A secondary particle-type electrode active material, in which uncarbonized, insoluble, and chemically cross-linked polyimide formed upon imidization of poly(amid acid) was formed, was prepared in the same manner as in Example 4, except that the secondary particles were subjected to a heat treatment in the air at a temperature of about 250° C. for about 2 hours, instead of a heat treatment in the air at a temperature of about 200° C. for about 2 hours.

Comparative Example 1

Preparation of an Electrode Active Material

About 5 parts by weight of a MWCNT (manufactured by CNT Co., Ltd, and having purity of 97% or greater, an average tube diameter of 20 nm, and an average tube length in a range of about 1 µm to about 25 µm), about 50 parts by weight of graphite powder (manufactured by SEC Carbon Ltd (e.g., SGP-1) and having an average particle diameter of about 4 µm), and about 10 parts by weight of PVA (manufactured by Sigma-Aldrich and having a weight average molecular weight Mw in a range of about 31,000 to about 51,000), based on 100 parts by weight of an electrode active material, were mixed to prepare a PVA aqueous solution. The prepared PVA aqueous solution was subjected to a first ultrasonic dispersion for about 1 hour, thereby obtaining a first mixed slurry.

About 35 parts by weight of silicon powder (having an average particle diameter of about 150 µm), based on 100 parts by weight of an electrode active material, was added to the first mixed slurry, followed by a second ultrasonic dispersion for about 1 hour, thereby obtaining a second mixed slurry. Here, an amount of solid content in the second mixed slurry was about 15 weight % based on the total weights of the first mixed slurry and the second mixed slurry.

The second mixed slurry was spray-dried with nitrogen gas sprayed in 60 liters/minutes by using a spray dryer (Mini Spray Dryer B-290 manufactured by BUCHI, a two-fluid nozzle type) at a temperature of about 220° C., thereby preparing composite particles including the silicon powder, the MWCNT, the graphite powder, and the PVA. Then, the composite particles were subjected to a sintering process at a temperature of about 750° C. for about 12 hours in a nitrogen gas atmosphere, thereby obtaining secondary particles.

Example 6

Preparation of a Lithium Secondary Battery (i.e., a Coin-type Cell)

Powders of the electrode active material of Example 1 were uniformly mixed with a binder including polyacrylate substituted with lithium (LiPAA available by Sigma-Aldrich), carbon black (Lion specialty chemicals, KB, KB600JD), and graphite powders (MC20, SFG6), thereby preparing a slurry for forming an anode active material in which a mixing ratio of solid content in the powders of the electrode active material of Example 1, LiPAA, carbon black, and graphite powders was about 40:8:1:51.

A copper foil having a thickness of 10 µm was coated with the slurry for forming the anode active material to a thickness in a range of about 50 µm to about 60 µm according to a bar coating method. The coated copper foil was dried, and then, additionally vacuum-dried at a temperature of 120° C., thereby preparing an anode electrode plate. The anode electrode plate was roll-pressed, thereby preparing a sheet-shaped anode for a coin-type cell. Here, the anode had a capacity in a range of about 3.0 mAh/cm$^2$ to about 3.5 mAh/cm$^2$.

The anode was used to prepare a coin-type half cell (CR2032 type) with a diameter of about 12 m. When preparing the coin-type half cell (CR2032 type), lithium metal was used as a counter electrode, and a lithium salt, in which 1.0M LiPF$_6$ was dissolved in a mixed solvent of ethylene carbonate (EC), diethyl carbonate (DEC), and fluoroethylene carbonate (FEC) (at volume ratio of 2:6:2), was used as an electrolyte.

Examples 7 to 10

Preparation of Coin-type Half Cells

Coin-type half cells were prepared in the same manner as in Example 6, except that in preparation of a slurry for an anode active material, powders of the electrode active materials of Examples 2 to 5 were each used instead of the powders of the electrode active material of Example 1.

Comparative Example 2

Preparation of a Coin-type Half Cell

A coin-type half cell (CR2032 type) was prepared in the same manner as in Example 6, except that in preparation of a slurry for an anode active material, powders of the electrode active material of Comparative Example 1 was used instead of powders of the electrode active material of Example 1.

Analysis Example 1

SEM Analysis on a Particle Shape and a Cross-section of an Electrode Active Material The electrode active material of Example 2 was subjected to the SEM analysis. The SEM analysis was performed by using a JSM-7600F manufactured by JEOL. The electrode active material of Example 2 was observed in terms of a particle shape and a cross-section thereof, and the observation results are shown in FIGS. 3A and 3B.

Figure 3A:
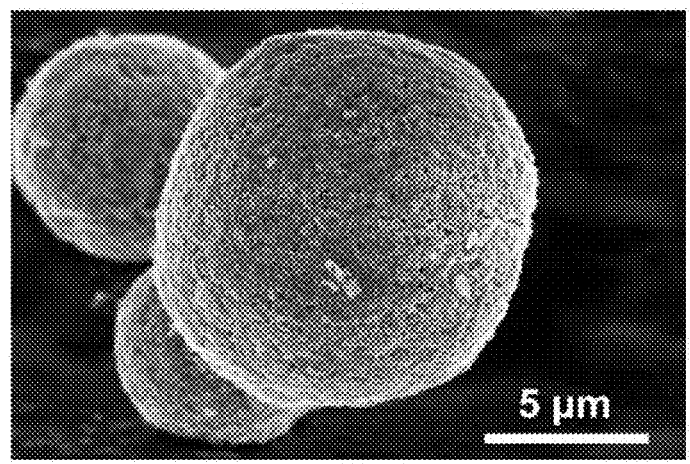
FIG. 3A is a scanning electron microscopy (SEM) image showing a particle shape of an electrode active material prepared according to Example 2.

Referring to FIG. 3A, it was confirmed that the electrode active material of Example 2 was prepared in the form of spherical secondary particles, each of which had a diameter of about 8 μm.

Figure 3B:
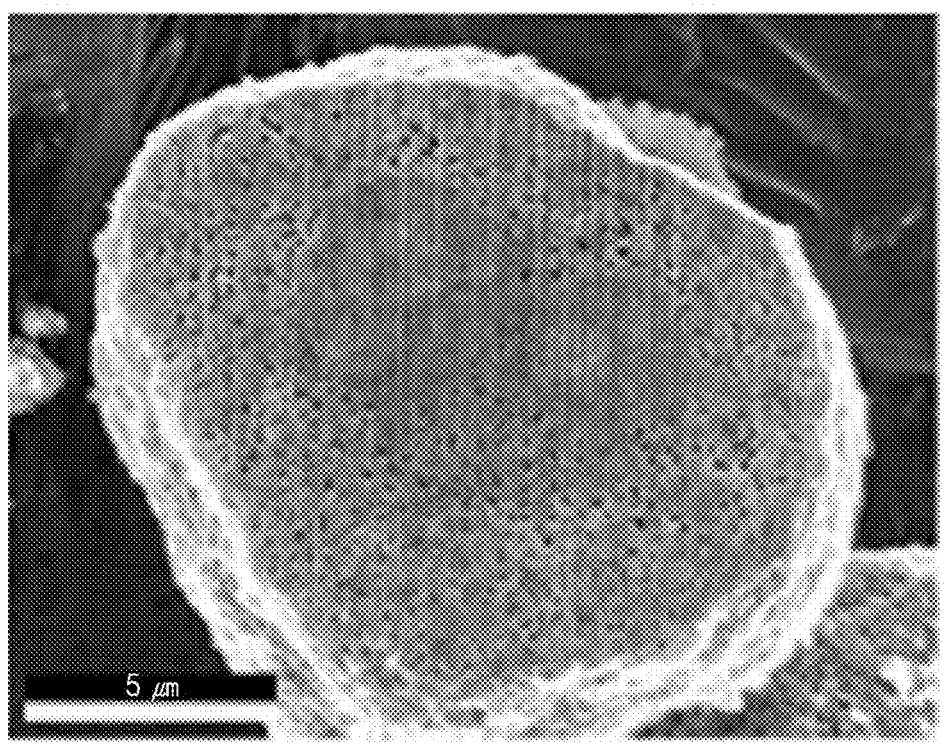
FIG. 3B is a scanning electron microscopy (SEM) image showing a cross-sectional view of the electrode active material prepared according to Example 2.

Referring to FIG. 3B, it was confirmed that a plurality of primary particles were evenly distributed in the spherical secondary particle of the electrode active material of Example 2, and that fine pores were distributed between the primary particles adjacent to each other.

Evaluation Example 1

Charge and Discharge Test (1) dQ/dV Profiles

The lithium secondary batteries prepared according to Comparative Example 2 and Example 7 were each charged with a constant current of 0.1 C rate at room temperature (25° C.) until a voltage of the lithium batteries reached about 0.01 V (vs. Li), and then, were each discharged with a constant current of 0.1 C rate until the voltage reached a cut-off voltage of about 1.5 V.

Subsequently, the lithium secondary batteries prepared according to Comparative Example 2 and Example 7 were each charged in the same manner as described above, and then, were each discharged with a constant current of a 0.2C rate until the voltage reached 1.0 V. This cycle of charging and discharging was repeated 4 times.

Subsequently, the lithium secondary batteries prepared according to Comparative Example 2 and Example 7 were each charged with a constant current of 1 C rate, and then, were each discharged with a constant current of 1 C rate until the voltage reached 1.0 V. This cycle of charging and discharging was repeated 15 times. Here, the term "C" used herein refers to a current rate of a cell or battery in terms of current flowing to thoroughly discharge its capacity in an hour.

FIGS. 5A and 5B are each a graph showing a part of voltage-dependent differential capacities (dQ/dV) of the lithium secondary batteries based on the charge and discharge profiles thereof.

Referring to FIG. 5A, the lithium secondary battery of Comparative Example 2 showed dQ/dV peaks at an operating potential of about 480 mV, when the cycle of charging and discharging was performed 10 times. Referring to FIG. 5B, the lithium secondary battery of Example 7 showed dQ/dV peaks at an operating potential of about 487 mV, when the cycle of charging and discharging was performed 10 times.

That is, in comparison with the lithium secondary battery of Comparative Example 2, it was confirmed that the lithium secondary battery of Example 7 showed a dQ/dV peak that is increased by about 7 mV, when the cycle of charging and discharging was performed 10 times.

In addition, referring to FIG. 5A, it was confirmed that, when the cycle of charging and discharging was performed 10 times, the lithium secondary battery of Comparative Example 2 showed a dQ/dV peak having an FWHM (a width of a peak at half-height of the maximum peak) of about 0.023 V (i.e., 230 mV). Referring to FIG. 5B, it was confirmed that, when the cycle of charging and discharging was performed 10 times, the lithium secondary battery of Example 7 showed a dQ/dV peak of about 0.05 V (i.e., 500 mV).

Accordingly, in comparison with the lithium secondary battery of Comparative Example 2, the lithium secondary battery of Example 7 showed the dQ/dV peak having an increased FWHM by about 0.027 V (i.e., 270 mV).

(2) Lifespan Characteristics

The lithium secondary batteries prepared according to Examples 7 to 12 were each charged with a constant current of 0.1 C rate at room temperature (25° C.) until a voltage of the lithium batteries reached about 0.01 V (vs. Li), and then, were each discharged with a constant current of 0.1 C rate until the voltage reached a cut-off voltage of about 1.5 V. Here, the charge capacity and discharge capacity of the lithium secondary batteries were measured (at the $1^{st}$ cycle).

Subsequently, the lithium secondary batteries prepared according to Examples 7 to 12 were each charged in the same manner as described above with, and then, were each discharged with a constant current of a 0.2C rate until the voltage reached 1.0 V. This cycle of charging and discharging was repeated 4 times.

Subsequently, the lithium secondary batteries prepared according to Comparative Example 2 and Example 7 were each charged with a constant current of 1 C rate, and then, were each discharged with a constant current of 1 C rate until the voltage reached 1.0 V. This cycle of charging and discharging was repeated 27 times. Here, the discharge capacity of each of the lithium secondary batteries was measured at the $27^{th}$ cycle. Lifespan characteristics of the lithium secondary batteries were evaluated based on a calculation according to Equation 1. Some of the evaluation results are shown in Table 1 and FIG. 6.

Capacity retention [%]=[Discharge capacity at a $27^{th}$ cycle/Discharge capacity at a $1^{st}$ cycle]×100%   Equation 1

TABLE 1

| | Capacity retention (%) |
|---|---|
| Example 7 | 82 |
| Example 8 | 83 |
| Example 9 | 80 |
| Example 10 | 75 |
| Example 11 | 70 |
| Example 12 | 85 |

Figure 6:
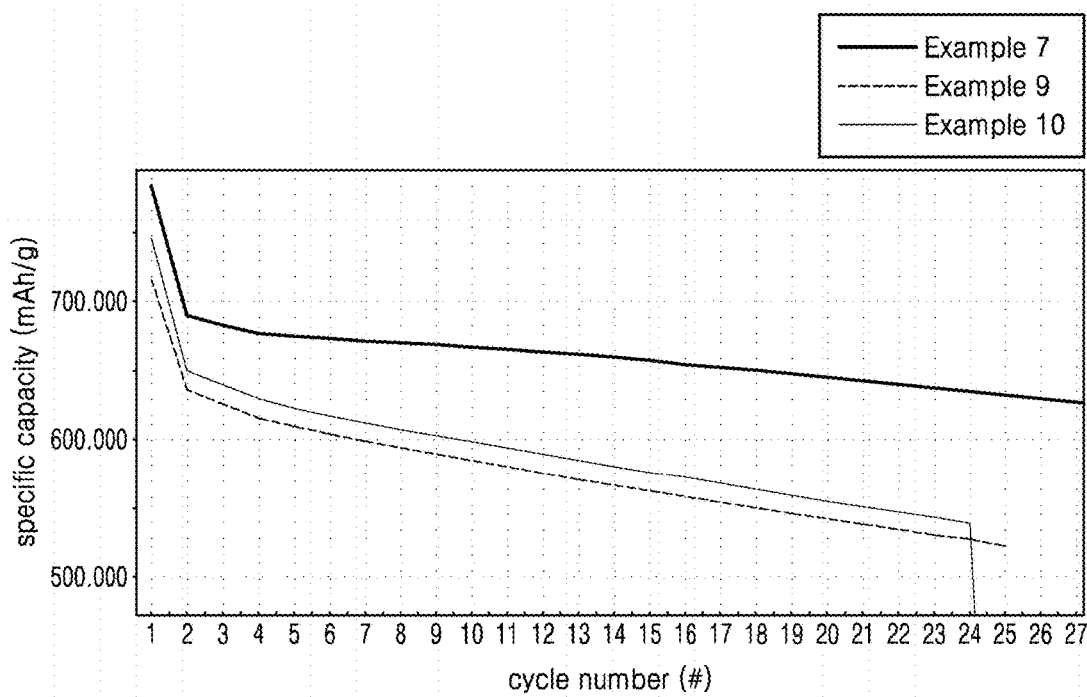
FIG. 6 is a graph of specific capacity (milliampere-hours per gram, mAh/g) versus cycle number showing changes in specific capacity of lithium secondary batteries, which are each prepared according to Examples 7, 9, and 10, depending on the number of cycles.

Referring to Table 1 and FIG. 6, it was confirmed that the lithium secondary batteries prepared according to Examples 7 to 12 each showed a capacity retention of at least about 70%.

In addition, under the same conditions of the charge and discharge test at room temperature (25° C.) (vs. Li), the cycle of charging and discharging was repeated on the lithium secondary batteries prepared according to Example 10 and Comparative Example 2 110 times. Here, the discharge capacity of each of the lithium secondary batteries was measured at the $110^{th}$ cycle. Normalized capacity retention of the lithium secondary batteries were evaluated based on a calculation according to Equation 2. Some of the evaluation results are shown in Table 2 and FIG. 7.

Normalized capacity retention [%]=[Discharge capacity at a $100^{th}$ cycle/Discharge capacity at a $1^{st}$ cycle]×100%    <Equation 2>

TABLE 2

| | Normalized capacity retention (%) |
|---|---|
| Example 10 | 85 |
| Comparative Example 2 | 78 |

Figure 7:
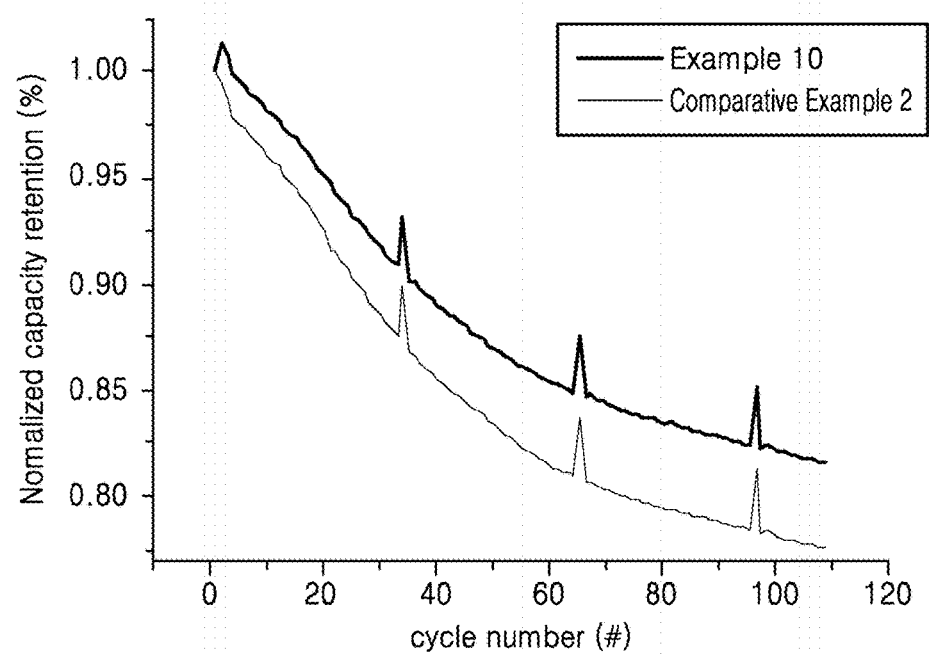
FIG. 7 is a graph of normalized capacity retention (percent, %) versus cycle number showing changes in normalized capacity retention of lithium secondary batteries, which are each prepared according to Example 10 and Comparative Example 2, depending on the number of cycles.

Referring to Table 2 and FIG. 7, the lithium battery prepared according to Example 10 showed improvement in a normalized capacity retention thereof, compared to that of the lithium battery prepared according to Comparative Example 2. Accordingly, it was confirmed that the lithium battery prepared according to Example 10 had improved lifespan characteristics, compared to that of the lithium battery prepared according to Comparative Example 2.

According to the one or more exemplary embodiments, an electrode active material based on secondary particles includes a plurality of silicon-based primary particles, an electrically conductive material, and a chemically cross-linked water-insoluble polymer, wherein the chemically cross-linked water-insoluble polymer serves as a controller for reaction and diffusion of lithium ions. An electrode and a secondary battery that include the electrode active material may have improved charge/discharge characteristics.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrode active material comprising a secondary particle, the secondary particle comprising:
   a plurality of primary particles of a silicon-containing material;
   an electrically conductive material; and
   a chemically cross-linked water-insoluble polymer disposed directly on and between adjacent primary particles of the silicon-containing material in the secondary particle,
   wherein the chemically cross-linked water-insoluble polymer comprises at least one selected from polyvinyl alcohol, poly(acrylic acid), a poly(acrylic acid) substituted with an alkali cation or an ammonium ion, polyimide, polyamideimide, polyvinylidene fluoride, carboxymethyl cellulose, carboxymethyl cellulose sodium salt, carboxymethyl cellulose ammonium salt, methylcellulose, hydroxymethylcellulose, hydroxypropyl cellulose, ethyl cellulose, diacetyl cellulose, polytetrafluoroethylene, polyethylene, and polypropylene,
   wherein the chemically cross-linked water-insoluble polymer is uncarbonized.

2. The electrode active material of claim 1, wherein the chemically cross-linked water-insoluble polymer is effective as a reaction barrier to lithium ions and as a diffusion barrier to lithium ions, with respect to the plurality of primary particles of the silicon-containing material.

3. The electrode active material of claim 1, wherein the electrically conductive material comprises at least one selected from a carbonaceous material, a metal nanostructure, and an electrically conductive polymer.

4. The electrode active material of claim 3, wherein the carbonaceous material comprises at least one selected from carbon black, natural graphite, artificial graphite, acetylene black, Ketjen black, carbon nanofiber, carbon nanotube, graphene, and expanded graphite.

5. The electrode active material of claim 3, wherein the metal nanostructure comprises at least one selected from gold nanoparticles, copper nanoparticles, nickel nanoparticles, aluminum nanoparticles, silver nanoparticles, titanium nitride nanoparticles, gold nanofibers, copper nanofibers, nickel nanofibers, aluminum nanofibers, silver nanofibers, TiN nanofibers, gold nanotubes, copper nanotubes, nickel nanotubes, aluminum nanotubes, silver nanotubes, and TiN nanotubes.

6. The electrode active material of claim 3, wherein the electrically conductive polymer comprises at least one selected from polyfluorene, polyphenylene, polypyrene, polypyrrole, polyazulene, polynaphthalene, polycarbazole, polyindole, polyazepine, polyaniline, polythiophene, poly(3,4-ethylenedioxythiophene), poly(p-phenylene sulfide), polyacetylene, poly(p-phenylene vinylene), poly(3,4-ethylenedioxythiophene)-polystyrene sulfonate, a derivative thereof, and a copolymer thereof.

7. The electrode active material of claim 1, wherein the plurality of primary particles of the silicon containing material comprises a primary silicon particle.

8. The electrode active material of claim 1, wherein the primary particles of the silicon-containing material have an average particle size in a range of about 0.1 nanometers to about 1 micrometers.

9. The electrode active material of claim 1, wherein a primary particle of the primary particles of the silicon-containing material further comprises a composite comprising a silicon core, and
a coating layer,
wherein the coating layer comprises an inorganic nanoparticle and is disposed on a surface of the silicon core.

10. The electrode active material of claim 9, wherein the inorganic nanoparticle comprises at least one selected from $Al_2O_3$, $TiO_2$, $Li_4Ti_5O_{12}$, $La_2Zr_2O_7$, and $Li_7La_3Zr_2O_{12}$.

11. The electrode active material of claim 9, wherein the coating layer further comprises a metal fluoride.

12. The electrode active material of claim 9, wherein the coating layer includes multiple layers.

13. The electrode active material of claim 1, wherein the plurality of primary particles comprises
a silicon-containing composite;
a carbonaceous nanoscaffold; and
a chemically cross-linked water-insoluble polymer.

14. The electrode active material of claim 13, wherein the carbonaceous nanoscaffold comprises at least one selected from a carbon nanotube, a carbon nanofiber, a carbon nanowire, and a combination thereof.

15. The electrode active material of claim 13, further comprising graphite, wherein the graphite is in a form of a flake or a sphere.

16. The electrode active material of claim 13, wherein an amount of the primary particles of the silicon-containing composite in the electrode active material is in a range of about 0.1 part by weight to about 99.9 parts by weight, based on 100 parts by weight of the electrode active material.

17. The electrode active material of claim 13, wherein an amount of the carbonaceous nanoscaffold in the electrode active material is in a range of about 0.1 part by weight to about 50 parts by weight, based on 100 parts by weight of the electrode active material.

18. The electrode active material of claim 13, wherein an amount of the chemically cross-linked water-insoluble polymer in the electrode active material is in a range of about 0.1 part by weight to about 99.9 parts by weight, based on 100 parts by weight of the electrode active material.

19. The electrode active material of claim 1, wherein an average particle diameter of the electrode active material is in a range of about 1 micrometer to about 100 micrometers.

20. The electrode active material of claim 1, wherein the electrode active material has a differential capacity peak with respect to $Li/Li^+$ at an operating potential in a range of about 200 millivolts to about 600 millivolts, and
wherein the differential capacity peak is increased by at least 1 millivolt compared to a peak of an electrode active material that does not include the chemically cross-linked water-insoluble polymer.

21. The electrode active material of claim 1, wherein the electrode active material has a differential capacity peak with respect to $Li/Li^+$ at an operating potential in a range of about 200 millivolts to about 600 millivolts, and
wherein the differential capacity peak has a full width at half maximum in a range of about 1 millivolts to about 400 millivolts.

22. An electrode comprising the electrode active material of claim 1.

23. A secondary battery comprising the electrode of claim 22.

24. The secondary battery of claim 23, wherein the secondary battery is a secondary lithium ion battery, a lithium-sulfur secondary battery, or a lithium air secondary battery.

25. A method of preparing an electrode active material, the method comprising:
contacting a plurality of primary particles of a silicon-containing material, an electrically conductive material, and a solvent to form a slurry;
mixing the slurry to aggregate the primary particles and the electrically conductive material to form secondary particles comprising the primary particles and the electrically conductive material;
contacting the slurry comprising the secondary particles and a solution for forming a chemically cross-linked water-insoluble polymer to form a mixture; and
heat treating the mixture to obtain the electrode active material, wherein the electrode active material comprises a secondary particle, wherein the secondary particle comprises
a plurality of primary particles of a silicon-containing material,
an electrically conductive material, and
a chemically cross-linked water-insoluble polymer disposed directly on and between adjacent primary particles of the silicon-containing material in the secondary particle,
wherein the chemically cross-linked water-insoluble polymer comprises at least one selected from polyvinyl alcohol, poly(acrylic acid), a poly(acrylic acid) substituted with an alkali cation or an ammonium ion, polyimide, polyamideimide, polyvinylidene fluoride, carboxymethyl cellulose, carboxymethyl cellulose sodium salt, carboxymethyl cellulose ammonium salt, methylcellulose, hydroxymethylcellulose, hydroxypropyl cellulose, ethyl cellulose, diacetyl cellulose, polytetrafluoroethylene, polyethylene, and polypropylene, and
wherein the chemically cross-linked water-insoluble polymer is uncarbonized.

26. The method of claim 25, wherein the slurry further comprises a binder.

27. The method of claim 26, wherein the binder is a polymer which is different from the chemically cross-linked water-insoluble polymer.

28. The method of claim 25, wherein the electrically conductive material comprises at least one selected from a carbonaceous nanoscaffold, and graphite in a form of a flake or in a form of a sphere.

29. The method of claim 25, wherein the slurry further comprises an inorganic nanoparticle.

30. The method of claim 25, wherein an amount of a solid content of the slurry is in a range of about 1 weight percent to about 50 weight percent, based on a total weight of the slurry.

31. The method of claim 25, wherein the solution for forming the chemically cross-linked water-insoluble polymer comprises a monomer comprising a functional group that is chemically capable of cross-linking to at least one selected from a hydroxyl group, an aldehyde group, a carboxy group, an amine group, and an amide group.

32. The method of claim 25, wherein the heat treatment is performed at a temperature of less than 600° C.

33. The method of claim 32, wherein the heat treatment is performed at a temperature of 300° C. or less.

* * * * *